United States Patent [19]
Tanaka et al.

[11] Patent Number: 6,128,166
[45] Date of Patent: Oct. 3, 2000

[54] MAGNETIC HEAD FOR INCREASING TRACK DENSITY OF A MAGNETIC DISK

[75] Inventors: Yoichiro Tanaka, Kawasaki; Norio Nakamura, Yokohama; Kazunori Moriya, Tokyo; Yuji Kubota, Yokohama; Takashi Hikosaka, Tokyo, all of Japan

[73] Assignee: Kabushiki Kaisha Toshiba, Kawasaki, Japan

[21] Appl. No.: 08/444,106

[22] Filed: May 18, 1995

Related U.S. Application Data

[63] Continuation of application No. 08/097,024, Jul. 27, 1993, abandoned.

[30] Foreign Application Priority Data

Mar. 11, 1993 [JP] Japan ................................. 5-050298
Jun. 30, 1993 [JP] Japan ................................. 5-162922

[51] Int. Cl.$^7$ .................................................. G11B 5/39
[52] U.S. Cl. ............................................................ 360/317
[58] Field of Search .................................. 360/125, 126, 360/113

[56] References Cited

U.S. PATENT DOCUMENTS 3,975,772  8/1976  Lin ........................................... 360/113
4,803,580  2/1989  Mowry ..................................... 360/113
5,079,662  1/1992  Kawakami et al. ..................... 360/113
5,168,409  12/1992  Koyama et al. ........................ 360/113

FOREIGN PATENT DOCUMENTS 0521442  1/1993  European Pat. Off. ................ 360/113

Primary Examiner—William R. Korzuch
Attorney, Agent, or Firm—Oblon, Spivak, McClelland, Maier & Neustadt, P.C.

[57] ABSTRACT

According to this invention, there is provided a magnetic recording/reproducing system having a recording head for recording a signal in a magnetic recording medium along recording tracks having a predetermined track pitch and a reproducing head for reproducing the recorded signal. A relationship between a recording track width Tw of the recording head and a reproduction width Tr of the reproducing head is defined as Tr>Tw. When conditions $g<(1500/Hc-Hc/4000\pi+0.3)/(Hc/400\pi-\frac{1}{2})$ and $g\geq(1500/Hc-Hc/4000\pi+0.3-Tp+Tw)/(Hc/400\pi-\frac{1}{2})$ are satisfied, an erase region is formed between the recording tracks. In this case, the gap length of the recording head is represented by g [$\mu$m], the recording track width is represented by Tw [$\mu$m], the track pitch is represented by Tp [$\mu$m], and the coercive force of the recording medium is represented by Hc [Oe].

18 Claims, 13 Drawing Sheets

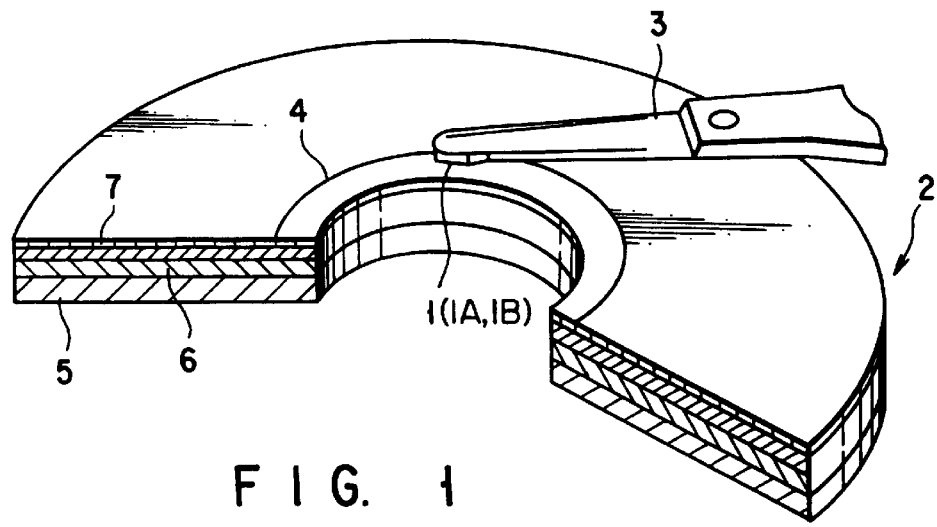
F I G. 1
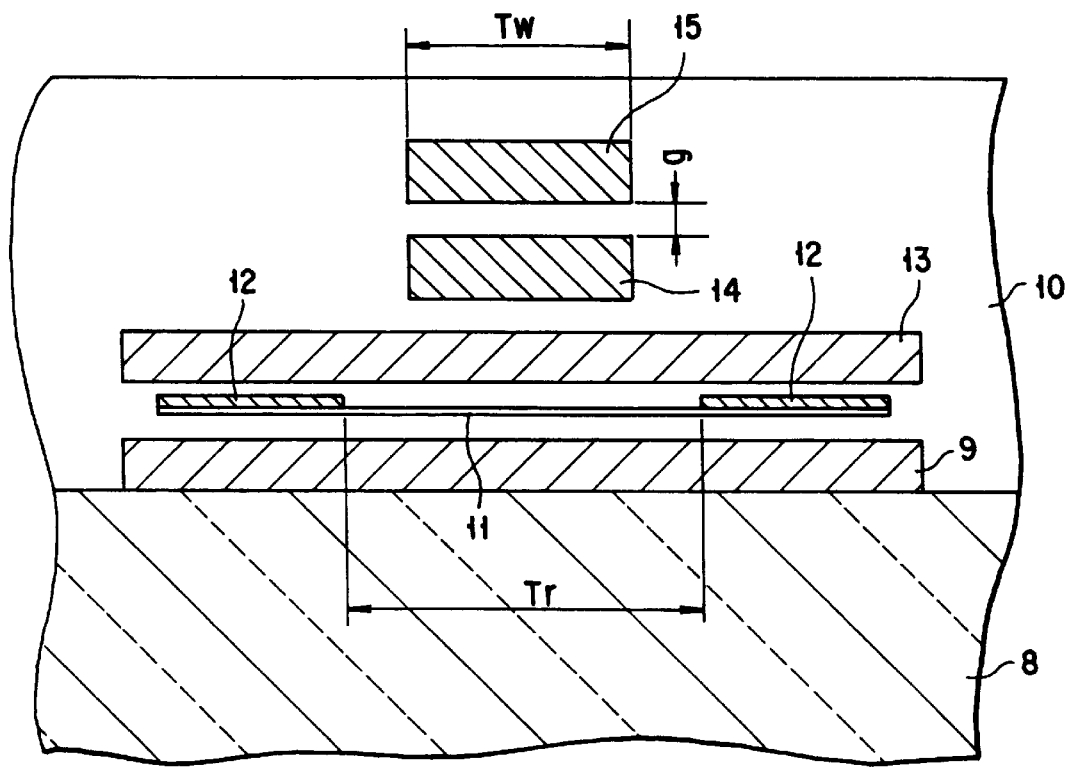
F I G. 2

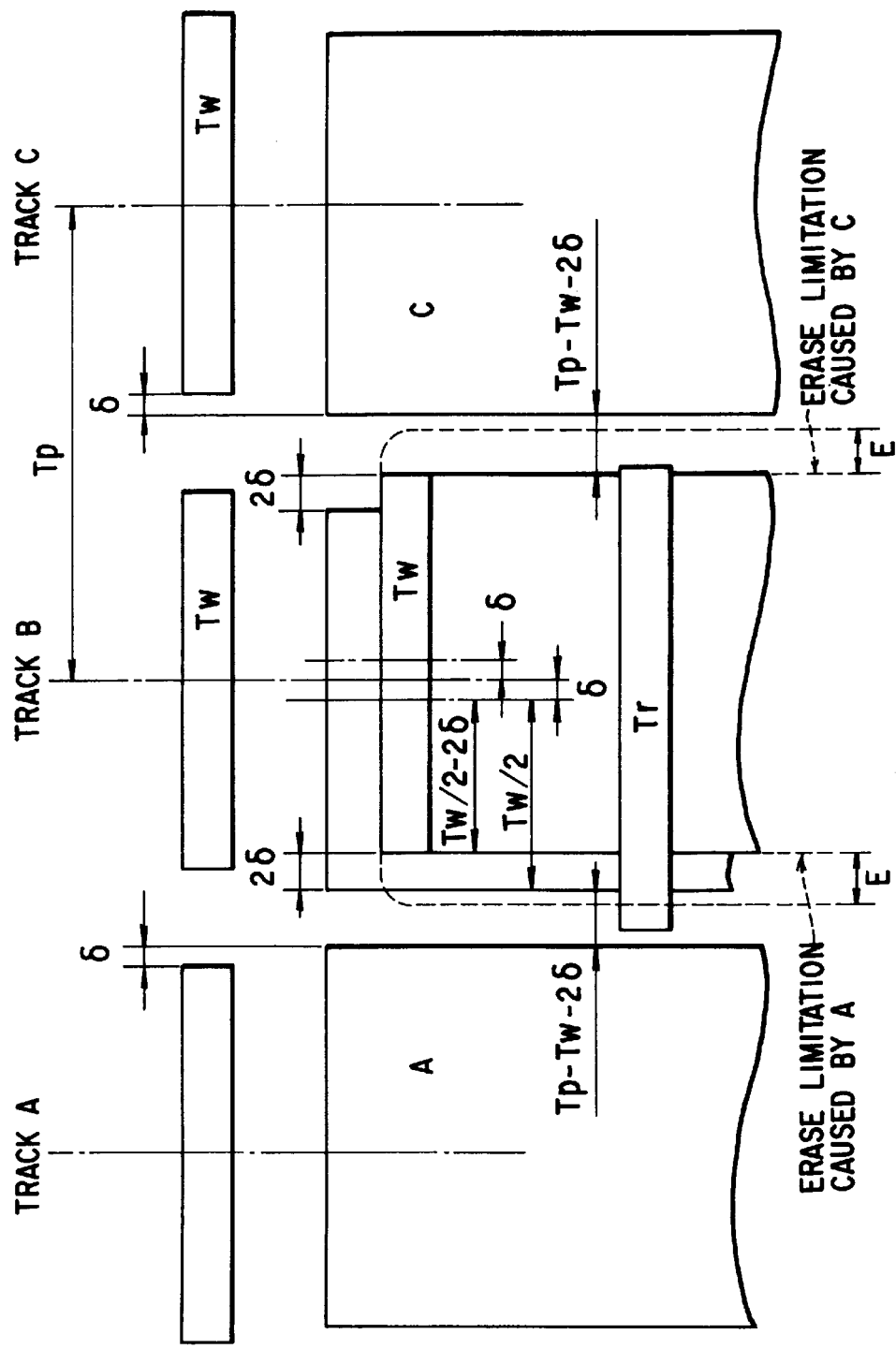
F I G. 3

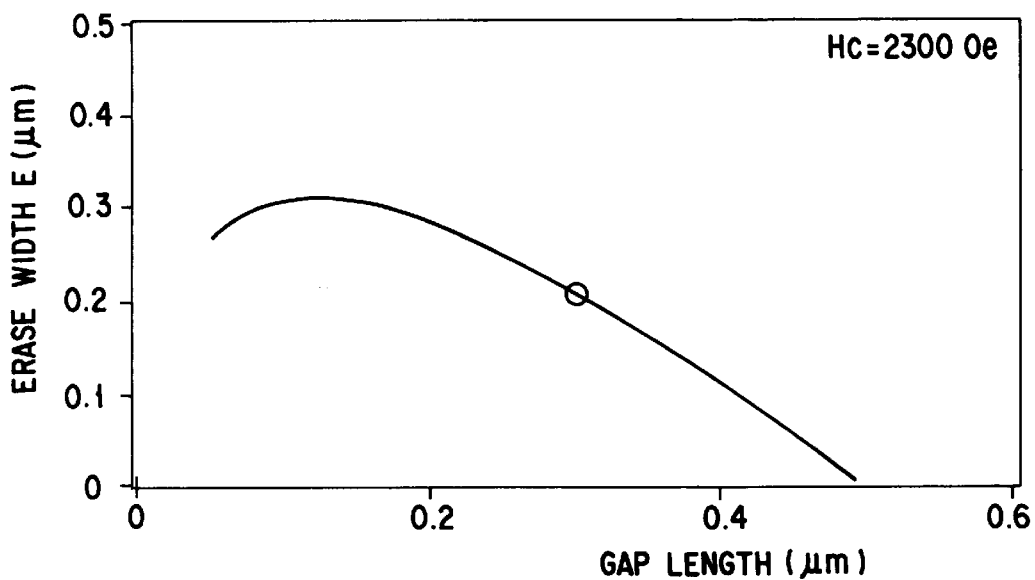
F I G. 4
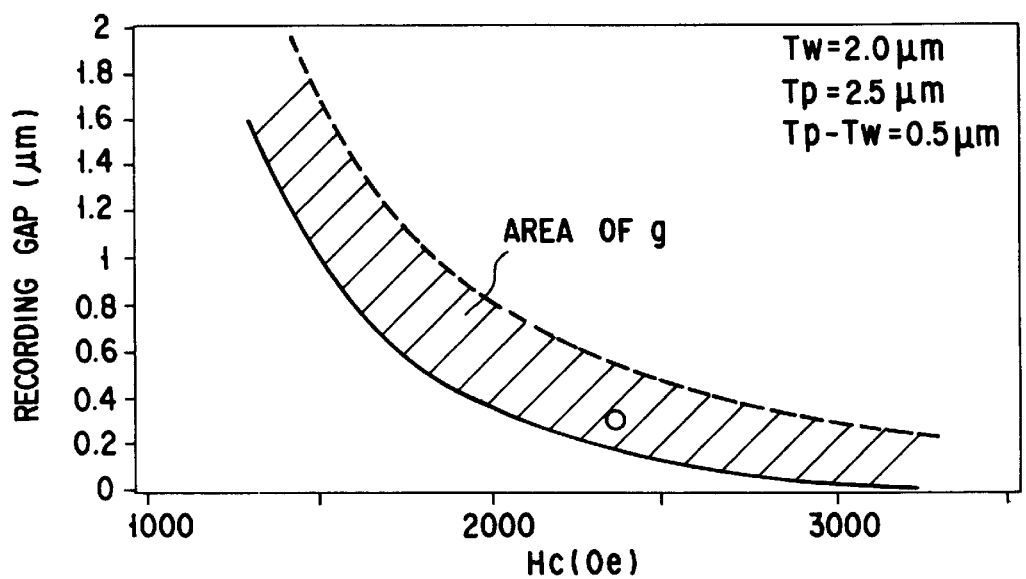
F I G. 5

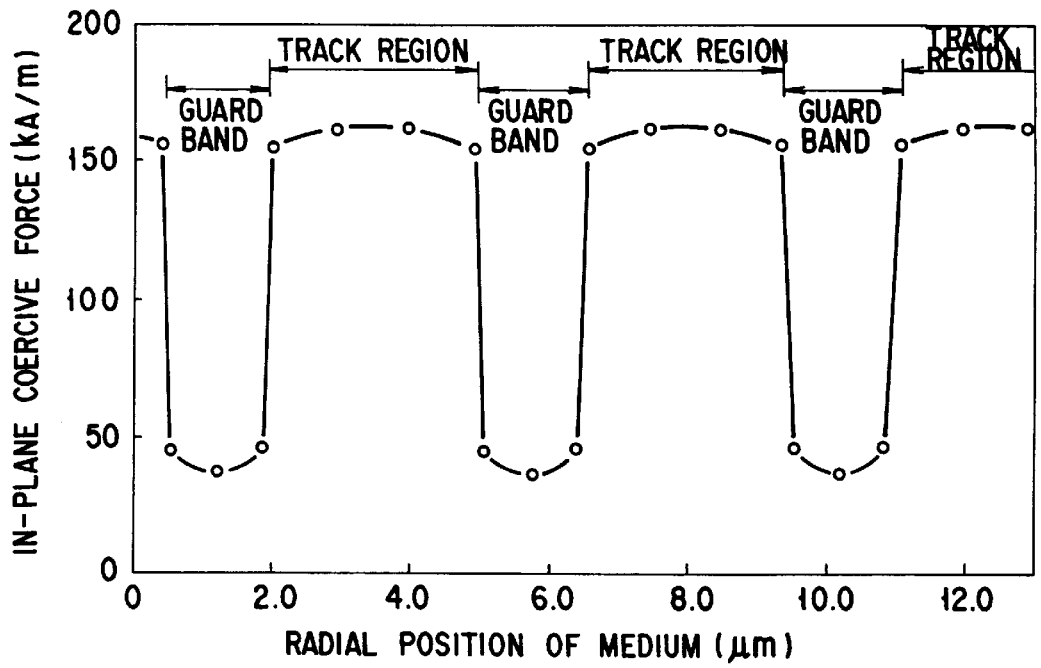
F I G. 15
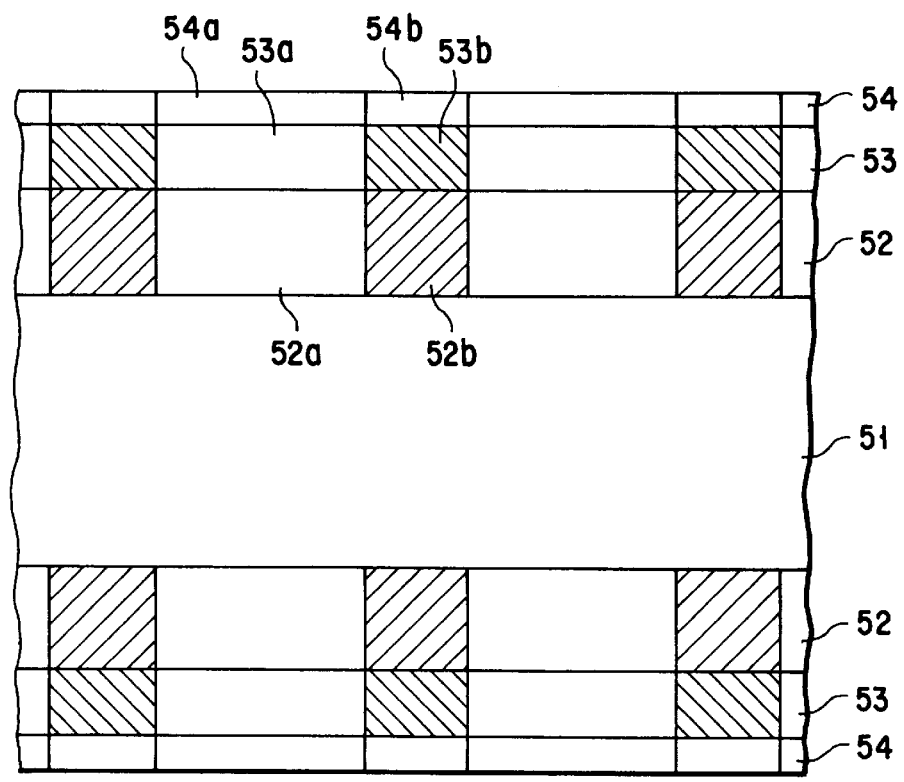
F I G. 16

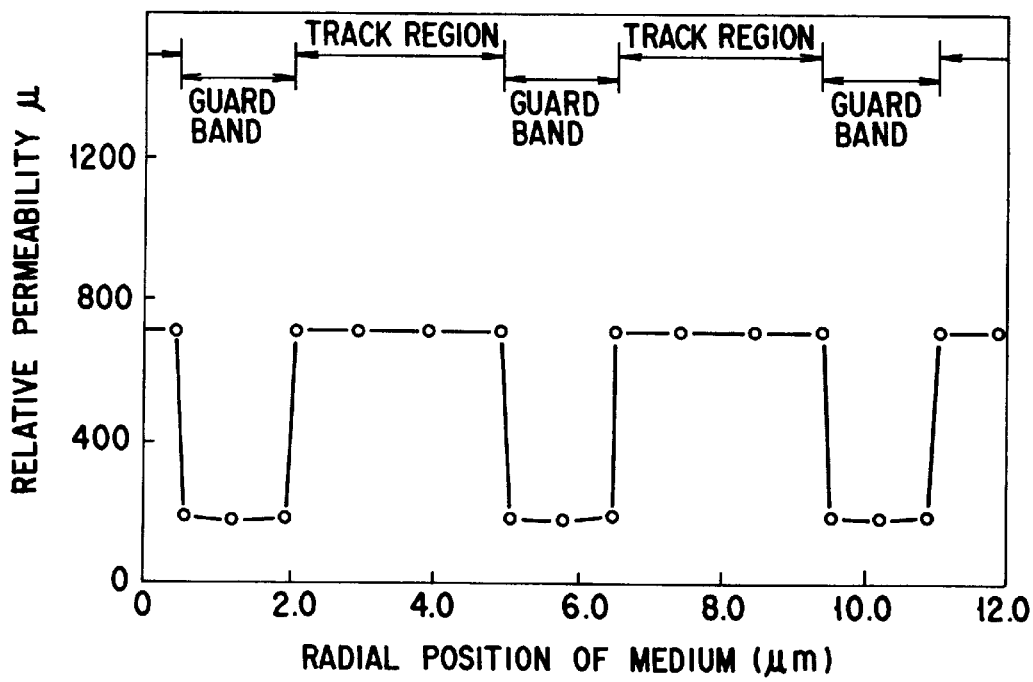
F I G. 17
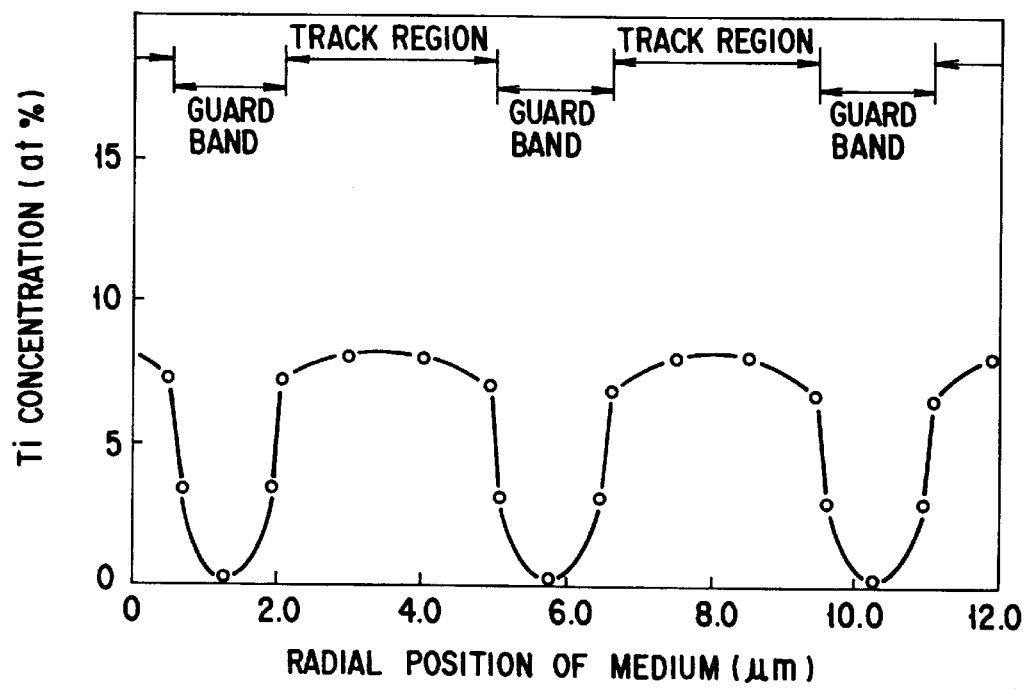
F I G. 18

MAGNETIC HEAD FOR INCREASING TRACK DENSITY OF A MAGNETIC DISK

This application is a Continuation of application Ser. No. 08/097,024, filed on Jul. 27, 1993, now abandoned.

BACKGROUND OF THE INVENTION

1. Field of the Invention

The present invention relates to a magnetic recording/reproducing system such as a hard disk device and, more particularly, to a magnetic recording/reproducing system capable of substantially increasing the track density of a magnetic disk.

2. Description of the Related Art

In recent years, a magnetic recording/reproducing system such as a hard disk device has been popularly used as a random-accessible external storage device having a large capacity in the field of computers. As the magnetic recording/reproducing system is widely applied, an increase in storage capacity and an increase in recording density are strongly demanded. For this reason, in order to meet these demands, research and development have been performed in various fields.

In general, a hard disk device comprises a rotatable magnetic recording medium and a magnetic head member. The magnetic recording medium is constituted such that a plurality of magnetic disks each obtained by forming a magnetic layer on a nonmagnetic substrate are stacked and mounted on one rotating shaft. The magnetic head member is constituted such that recording/reproducing heads are arranged on an arm moved by an actuator. In this case, the recording/reproducing heads are arranged on the respective disk surfaces, and the heads are positioned such that the arms are moved by the actuator.

When information is to be recorded/reproduced by the hard disk device having the above structure, each of the heads is not brought into direct contact with a corresponding one of the disk surfaces rotated at high speed, and the head accesses a predetermined position of the disk surface while the head slightly floats from the disk surface. A signal is recorded by the head along concentric tracks on the disk surface, or the recorded signal is reproduced therefrom.

In the above hard disk device, in order to meet a demand of increasing a storage capacity, the following attempts have been performed. That is, the line recording density of a disk, i.e., a density in a direction of track length, is increased to increase a recording density, or a track width is decreased to increase a track density, thereby increasing a recording density.

In recent years, in order to increase a recording density, the research and development of contact recording in which a head floats at a very low level or brought into almost contact with a recording medium to record/reproduce a signal are energetically performed.

As a method of increasing a recording density, a perpendicular magnetic recording scheme was proposed in 1975. According to this perpendicular magnetic recording scheme, the demagnetization field of a magnetization transition portion is theoretically much smaller than that of a conventional longitudinal magnetic recording scheme in which an anisotropy is formed in a longitudinal direction. For this reason, the width of the magnetization transition is decreased, and high-density recording can be performed. In addition, according to the perpendicular magnetic recording scheme, a recording magnetic field having a more perpendicular direction can be obtained by a perpendicular magnetic recording head using a strip-like soft magnetic thin film. It is known that the perpendicular magnetic recording scheme is effective to increase a recording density.

In order to increase recording/reproduction efficiency to form a sharp magnetization transition, a vertical two-layered medium in which a soft magnetic backing layer is formed under a perpendicular anisotropic layer was proposed and has been developed. In this medium, the magnitude of a demagnetization field at the distal end of a head is decreased by magnetic interaction of the head and the soft magnetic backing layer, and a generated magnetic field having a large magnitude can be obtained. In reproduction, as in the recording, since the magnitude of demagnetization field at the distal end of the head is small, an effective magnetic permeability is increased, and magnetic fluxes from the medium are effectively converged on the head, thereby obtaining a signal having a large magnitude.

On the other hand, in order to improve sensitivity in signal reproduction, an active head such as an MR head using a magnetoresistance effect is popularly developed. The MR head is a head for converting a magnetic flux from a recording medium into an electrical signal using the nature in which the electric resistance of a soft magnetic material such as a permalloy is changed by an external magnetic field. Since this head performs reproduction such that a change in electric resistance of an MR element translates into a change in voltage, the reproduction sensitivity of the head is proportional to the magnitude of a sense current flowing in the soft magnetic material. For this reason, even when a relative speed of the head and the medium is low, a large output can be obtained, and a line recording density can be increased. In addition, as will be described in References 1 to 5, the large output from the MR head is effectively used to decrease a track width, so that a track density can be increased to a maximum of 17,000 TPI (Track Per Inches).

Reference 1: IEEE Transactions on Magnetics, Vol. 26, No. 5, 1689–1693 (1990); C. Tsang, M. Chen, T. Yogi and K. Ju, "Gigabit Density Recording Using Dual-element MR/Inductive Heads on Thin Film Disks"

Reference 2: IEEE Transactions on Magnetics, Vol. 26, No. 5, 2169–2171 (1990); R. Jensen, J. Mortelmans and R. Hauswitzer, "Demonstration of 500 Megabits per Square Inch with Digital Magnetic Recording"

Reference 3: IEEE Transactions on Magnetics, Vol. 26, No. 5, 2271–2276 (1990); T. Howell, D. McCown, T. Diola, Y. Tang, K. Hense and R. Gee, "Error Rate Performance of Experimental Gigabit per Square Inch Recording Components"

Reference 4: IEEE Transactions on Magnetics, Vol. 27, No. 6, 4678–4683 (1992); H. Takano, H. Futamoto, M. Suzuki, K. Shiiki and M. Kitada, "Submicron-Track Width Inductive/MR Composite Head"

Reference 5: IEEE Transactions on Magnetics, Vol. 27, No. 6, 5280–5285 (1992); M. Futamoto, F. Kugiya, M. Suzuki, H. Takano, Y. Matsuda, N. Inaba, Y. Miyamura, K. Akagi, T. Nakao, H. Sawaguchi, H. Fukuoka, T. Munemoto and T. Takagaki, "Investigation of 2 Gb/in2 Magnetic Recording at a Track Density of 17 kTPI"

In a magnetic recording/reproducing system such as a magnetic disk device, when a positioning error of a head for a track, i.e., a tracking error, is present, a so-called incomplete erasure phenomenon in which magnetization of an old recording signal is left by a tracking error in recording occurs. When the recorded signal is to be reproduced, a signal to be reproduced is reproduced, and, at the same time, an incompletely erased signal is reproduced as noise by a tracking error in reproduction. For this reason, a ratio of a signal to noise (SNR) is decreased.

As a technique for reducing the incomplete erasure or reducing an influence of the incomplete erasure, the following methods are known.

As a first method, a non-signal region (a non-signal region formed in the following manner is called an erase region) in which a substantially effective signal is not present is formed on each of both the side edges of a recording track using an erasing effect obtained by a magnetic field (called a side-fringe magnetic field) leaking from the gap of a recording head to the outside of the recording track, thereby reducing incomplete erasure. However, when a track density is increased by decreasing a track pitch, the side-fringe magnetic field may largely erase a signal on an adjacent track.

As the second method, a reproduction width Tr defined by a reproducing head is set to be smaller than the recording track width Tw defined by a recording head not to reproduce incomplete erasure (indicated by oblique lines) as much as possible. Although this can reduce noise generated by the incomplete erasure, since a reproduction output is decreased by a decrease in reproduction track width, an SNR cannot be sufficiently increased.

SUMMARY OF THE INVENTION

It is an object of the present invention to provide a magnetic recording/reproducing system capable of eliminating incomplete erasure caused by a positioning error of a recording head, preventing a side-fringe magnetic field from erasing a signal on an adjacent track, and substantially increasing a track density of a magnetic disk by obtaining a large reproduction output.

The above object is achieved by the following magnetic recording/reproducing system. That is, a magnetic recording/reproducing system comprising:

a magnetic head member having a recording head and a reproducing head, a magnetic recording medium in which a signal is recorded and reproduced by the magnetic head member and to which tracks for recording and reproducing the signal are provided;

first means for providing recording tracks each having a width Tw and reproducing tracks each having a width Tr (Tr>Tw) to the magnetic recording medium; and second means for providing a non-signal region, in which a substantially effective signal is not present, between the recording tracks.

According to the present invention, an incomplete erasure phenomenon caused by a track positioning error of the recording head can be avoided. A signal of an adjacent track is not unnecessarily erased by a side-fringe magnetic field. In addition, since the reproduction width Tr is large, a large reproduction output can be obtained, thereby increasing an SNR.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partial sectional perspective view showing a magnetic recording/reproducing system according to the first embodiment;

FIG. 2 is a schematic view showing a magnetic head in the first embodiment;

FIG. 3 is a view showing an arrangement of tracks in the first embodiment;

FIG. 4 is a graph showing a relationship between a gap length and an erase width in the first embodiment;

FIG. 5 is a graph showing a range of the gap width of the magnetic head with respect to the coercive force of a magnetic recording medium in the first embodiment;

FIG. 15 is a graph showing a coercive force distribution of the magnetic recording medium according to the seventh embodiment;

FIG. 16 is a schematic sectional view showing a magnetic recording medium according to the eighth embodiment;

FIG. 17 is a graph showing a relative magnetic permeability distribution of a soft magnetic backing layer in the magnetic recording medium according to the eighth embodiment;

FIG. 18 is a graph showing the Ti concentration distribution of a perpendicular magnetic film in a magnetic recording medium according to the ninth embodiment;

DETAILED DESCRIPTION OF THE PREFERRED EMBODIMENTS

Figure 6:
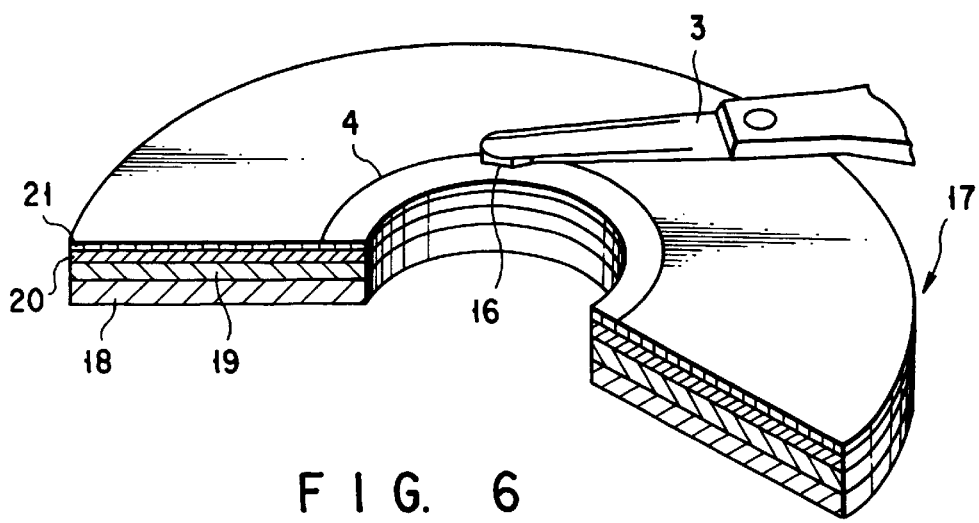
FIG. 6 is a partially sectional perspective view showing a magnetic recording/reproducing system according to the second embodiment.

The principle of the present invention will be described below prior to a description of preferred various embodiments. That is, the gist of the present invention lies in that a recording track width Tw is formed to be larger than a reproduction width Tr, and a non-signal region is formed between recording tracks of a magnetic recording medium. These formations can be achieved by a magnetic head member and/or a magnetic recording medium. In the embodiments (to be described later), the structure of a novel magnetic head is disclosed, the purpose of the present invention can be clearly understood by drawings and equations, and the structure of a novel magnetic recording medium is disclosed, so that the various embodiments of the present invention can be clearly understood.

In a magnetic head and/or a magnetic recording medium according to the present invention, an incomplete erasure phenomenon caused by a track positioning error of the recording head can be avoided. In addition, a side-fringe magnetic field does not unnecessarily erase a signal of an adjacent track. Since a reproduction width Tr is large, a large reproduction output can be obtained, thereby increasing an SNR.

The present invention can be arranged using a ring recording head. In this case, the gap length g [μm] of the ring recording head depends on the following inequalities:

$$g < (1500/Hc - Hc/4000\pi + 0.3)/(Hc/400\pi - \frac{1}{2})$$

and $$g \geq (1500/Hc - Hc/4000\pi + 0.3 - Tp + Tw)/(Hc/400\pi - \frac{1}{2})$$

where Tw [μm] is a recording track width, Tp [μm] is a track pitch, and Hc [Oe] is the coercive force of the recording medium.

According to the present invention, when the gap width g of the ring recording head satisfies the above inequalities, a non-signal region can be formed using a side-fringe magnetic field leaking from the gap of the recording head to the outside of a track. Therefore, the incomplete erasure phenomenon caused by the track positioning error of the recording head can be avoided, and the side-fringe magnetic field can be prevented from unnecessarily erasing a signal of an adjacent track.

A non-signal region in which a substantially effective signal is not present especially in a short-wavelength region is formed on each of both the side edges of a recording track by a side-fringe magnetic field leaking from the gap of the recording head to the outside of the track. The non-signal region formed by the side-fringe magnetic field is called an erase region. A width (called an erase width) E of the erase region is determined by a magnetic field generated by the recording head, the gap width of the recording head, and a coercive force Hc of the recording medium. In this case, the magnetic field generated by the recording head mainly depends on the gap length in an effective range. Therefore, the erase width E is mainly determined by the gap width and the coercive force.

More specifically, as expressed in expressions (7) and (8) in the following Reference 6, the erase width E is expressed by equations (1) and (2):

Reference 6: IEEE Transactions on Magnetics, Vol. 13, No. 5, 1457–1459 (1977); G. F. Hughes and D. S. Bloomberg, "Recording Head Side Read/Write Effects"

$$E = Zo[\{2Hc/Hg + 5/4\}^2 - (d/Zo)(4Hc/Hg + d/Zo + \frac{1}{2})\}^{1/2} - (2Hc/Hg - \frac{1}{4})]$$
[μm] (1)

$$Zo = 0.76 g/\pi \tan(cHc/2Hg)$$ (2)

where

Hc: longitudinal coercive force of recording medium [Oe]
Hg: magnetic field in recording gap [Oe]
d: distance between head and medium [μm]
g: gap length In this case, when the ring recording head is regarded as a toroidal core having a small gap having the length g, the magnetic field Hg in the gap can be expressed by equation (3) with simple calculation.

$$Hg = 4000\pi \cdot NI/(g + pAg/\mu Ac) \ [Oe]$$ (3)

where

NI: recording magnetomotive force [A·T]
p: recording head magnetic path length [μm]
Ag: sectional area of gap portion [μm²]
Ac: sectional area of magnetic core portion [μm²]
μ: relative magnetic permeability of magnetic core In a practical thin film recording head, a saturation magnetic flux density Bs of a head magnetic core is about 1 kG, a relative magnetic permeability μ is several hundreds, a magnetic path length p is several tens μm, Ag/Ac=1 is satisfied near the gap, and a gap length g is 1 μm or less. In this thin film recording head, since a condition in which a magnetic flux density in the gap does not exceed the saturation magnetic flux density of the magnetic core must be satisfied, equation (3) can be approximately expressed by equation (4).

$$Hg = 800\pi/(g + 0.1) \ [Oe]$$ (4)

In order to obtain a sufficient recording capability, Hg>>Hc must be satisfied. For this reason, equation (2) can be approximated using equation (4) as expressed by equation (5).

$$Zo = 1200/Hc \cdot g/(g + 0.1) \ [\mu m]$$ (5)

Equations (4) and (5) are substituted into equation (1), the resultant equation is approximated using a condition that d is sufficiently smaller than g, and a term for correcting an error caused by the approximation is added. In this case, the erase width E can be expressed by equation (6):

$$E = g\{\frac{1}{2} + 1500/Hc(g + 0.1)\} - Hc(g + 0.1)/400\pi + 0.3$$ (6)

In order to eliminate incomplete erasure caused by a track positioning error, when the maximum value of the positioning error is set to be 2δ, the maximum value 2δ satisfies E>2δ. Although 2δ can be decreased by improving tracking servo precision and improving the decentering precision of a disk spindle, 2δ cannot be substantially set to be 0. Therefore, when at least E>0 or, preferably, E>2δ is satisfied, incomplete erasure can be eliminated. When this condition is calculated on the basis of equation (6), inequation (7) can be obtained:

$$g < (1500/Hc - Hc/4000\pi + 0.3)/(Hc/400\pi - \frac{1}{2})$$ (7)

In addition, when a finite erase width is to be formed, a recorded signal of an adjacent track must not be unnecessarily erased. In other words, a recording track is allowed to be subjected to erasure by the adjacent track such that signal quality of the recording track is not influenced in reproduction. Therefore, a maximum track density can be obtained.

Assuming that a track pitch and a recording track width of the recording head are represented by Tp and Tw, respectively, when E≦Tp−Tw is satisfied, the above condition is satisfied, and the track density can be increased without degrading signal quality. When this condition is calculated on the basis of equation (6), inequation (8) is obtained:

$$g \geq (1500/Hc - Hc/4000\pi + 0.3 - Tp + Tw)/(Hc/400\pi - \tfrac{1}{2}) \qquad (8)$$

In a magnetic recording/reproducing system in which data signals and servo signals for tracking are recorded in the same track, when different servo signals are recorded on both the sides of the center line of a data track, which center line is used as a boundary, an erase region having a width E defined by the recording head is present at a boundary portion, and this portion has no servo signal. When a servo signal is to be read by a reproducing head having a reproduction width Tr, since reproduction is performed across the erase region of the servo signal, a substantial servo signal width is give by Tr−E. In this case, when the width Tr of the reproducing head is set to be larger than Tw+E, the servo signal erased by the erase region is compensated, and a servo signal having good signal quality can be reproduced, thereby improving tracking precision. When the erase width E satisfies E>0, Tr>Tw, i.e., a>b, is satisfied.

The reproduction track width Tr of the reproducing head is set to be smaller than Tp+2a, the signal quality of the servo and data signals can be improved without erroneously read data signals of an adjacent track.

As a method of forming an erase region between recording tracks, in place of using a side-fringe magnetic field, an erasing head, e.g., a head called a tunnel erase head, may be arranged near the recording head, and erase regions may be respectively formed on both the sides of the recording track by the erasing head.

On the other hand, a signal is to be recorded in a perpendicular magnetic recording medium, a perpendicular magnetic recording single-pole head in which an end portion in a direction of recording track width has a main pole piece formed in a tapered shape to have a narrow trailing side is used as a recording head, the width of the tapered portion is represented by p, a recording track width is represented by Tw, and a track pitch on the magnetic recording medium is represented by Tp. In this case, the following condition is satisfied:

$$0 < p \leq Tp - Tw \qquad (9)$$

More specifically, when a vertical two-layered substrate obtained by stacking a soft magnetic backing layer and a perpendicular anisotropic layer is used as a recording medium, an incomplete erasure phenomenon caused by a track positioning error of the recording head can be avoided using side-surface magnetic fields of the single-pole head. A signal of an adjacent track is not unnecessarily erased by the side-surface magnetic field, either.

In perpendicular magnetic recording using a perpendicular magnetic recording single-pole head and a perpendicular magnetic recording member, a side-fringe magnetic field leaking to the outside of a track is very abruptly attenuated, so that an erase region is rarely present. When the head in which an end portion in a direction of recording track width has a main pole piece formed in a tapered shape to have a narrow trailing side is used, an erase region having a width corresponding to the width of the tapered portion can be formed at each of both the side edge of the recording track. In each of the erase region, a magnetization transition having an inclination accurately equal to the taper angle is formed due to a high recording resolution of a perpendicular magnetic recording scheme. However, since an azimuth angle between the reproducing head and the erase region is very large, the erase region cannot give an effective reproduction signal, and the region substantially functions as an erase region. In addition, when a condition wherein the erase region does not unnecessarily erase recording signals of adjacent tracks is also considered, the width of the tapered portion is represented by p, and inequality (9) is satisfied.

A non-signal region of the magnetic recording medium can be formed such that at least one of the saturation magnetization and coercive force of a region between recording tracks is smaller than a corresponding one of those of the recording track. The non-signal region formed as described above is called a guard band region. In this case, assume that the maximum value of a positioning error of the recording head and the reproducing head is set to be 2δ, that a width GB of a guard band region in a direction of recording track width satisfies GB≧2δ, that a track pitch is set to be Tp, and that Tp−Tw=2a is satisfied. In this case, when a condition of Tr>Tp−2δ−2a is satisfied, the prescribed object is achieved.

Various preferred embodiments according to the above-described purpose of the present invention will be described below with reference to the accompanying drawings.

First Embodiment

FIG. 1 is a partial sectional perspective view showing the arrangement of a magnetic recording/reproducing system including a ring head 1A and a MR head 1B according to the first embodiment. The magnetic recording/reproducing system of this embodiment includes a magnetic head 1 and a recording medium 2 which serve as the main elements of a magnetic head member.

The magnetic head 1 has a magnetoresistance effect element (MR element) for reproducing a magnetic signal recorded in the recording medium, and is arranged to oppose the recording medium 2 through an arm 3. The magnetic head 1 is positioned by an actuator (not shown) on a desired track 4 of a plurality of desired tracks concentrically formed in the recording medium 2.

In the recording medium 2, a recording magnetic layer 6 constituted by a metal thin film, and a protective layer 7 are sequentially stacked on a disk-like nonmagnetic substrate 5. More specifically, a glass substrate 5 having a diameter of 2.5 inches and a thickness of 0.635 mm was prepared as the nonmagnetic substrate 5, and the recording magnetic layer 6 consisting of CoPt and having a thickness of 0.04 μm was formed on the nonmagnetic substrate 5 by DC magnetron sputtering in an argon gas atmosphere. The recording magnetic layer 6 is a longitudinal recording medium having an easy axis of magnetization in a longitudinal direction, and it is a longitudinal isotropic medium having no magnetic anisotropy in a specific direction within the longitudinal surface of the recording magnetic layer 6. The coercive force of the recording magnetic layer 6 in the longitudinal direction was 2,300 [Oe]. The protective layer 7, consisting of SiO$_2$, for assuring durability against contact of the head and an insulating property from the MR element was formed by RF sputtering.

The magnetic head 1 is a composite head obtained such that a shield MR head serving a reproducing head and a ring recording head are formed and stacked by a thin film deposition process at the outflow end (the downstream side in the traveling direction of the recording medium) of a floating slider.

FIG. 2 is a view showing the structure of the magnetic head 1 when viewed from a surface opposite to the recording medium. A permalloy shield layer 9 having a thickness of 1 µm was formed on a substrate 8 serving as a slider consisting of $Al_2O_3$–TiC, and an MR element 11 having a thickness of 0.04 µm and consisting of a permalloy was formed on the resultant structure through a nonmagnetic insulating layer 10 having a thickness of 0.13 µm. Leads 12 for supplying a sense current to the MR element 11 were formed on both the end portions of the MR element 11 at a reproduction width Tr=2.4 µm, and a permalloy shield layer 13 having a thickness of 1 µm was formed on the leads 12 through a nonmagnetic insulating layer 10 having a thickness of 0.13 µm, thereby forming a reproducing shield MR head. In addition, a 1.2 µm thick magnetic pole piece 14 of a recording ring thin film head was formed on the permalloy shield layer 13 through a nonmagnetic insulating layer 10 having a thickness of 0.5 to 2 µm, and a magnetic pole piece 15 having a thickness of 1.2 µm was formed on the magnetic pole piece 14 through a nonmagnetic insulating layer 10 having a thickness of 0.3 µm corresponding to a gap length, thereby forming a recording head having a recording track width Tw of 2 µm and a gap length g of 0.3 µm.

FIG. 3 shows a state of forming recording tracks on the recording medium 2 using the magnetic head 1 in FIG. 2. A track pitch Tp was 2.5 µm, and three adjacent tracks were shown in FIG. 3. A track density was 10,160 TPI. The space between the head and the medium was 0.04 µm.

In FIG. 3, tracks A, B, and C are ordered from the right. In this experiment, assuming that the track positioning error of the recording and reproducing heads was ±δ, δ was 0.1 µm. That is, a maximum error of 2δ=0.2 µm was generated. In the track B, an old recording signal (indicated by hatched lines) which was incompletely erased and had a wavelength of 1 µm was recorded at a position shifted to the left from the track center by δ, and a new recording signal having a wavelength of 0.45 µm was recorded at a position shifted to the right from the track center by δ. In the same track, the new signal was recorded by the maximum shift amount. At this time, in each of the adjacent tracks A and C, a signal having a wavelength of 0.7 µm was recorded at a position shifted on the track B side by a maximum shift amount of δ. In this state, the width of a non-signal region (erase region) on each of the recording tracks, i.e., an erase width E, was 0.21 µm. A change in erase width E when the gap length g is changed is shown in FIG. 4.

With the above arrangement, incomplete erasure on a recording track was eliminated. Even when the reproducing head having a reproduction width Tr reproduced a signal on the track B, an SNR was not decreased because an incompletely erased signal was not produced as noise. In addition, the signal quality of the track B was not degraded by the erasing operations on the adjacent track A or C, either.

The reproduction width Tr is larger than the recording track width Tw as described above. In this embodiment, although the reproduction width Tr is limited to the following inequality, when the reproduction width Tr is set to be 2.4 µm, the following condition is satisfied:

$$Tw+4\delta \leq Tr \leq 2Tp-Tw-4\delta \quad (10)$$

FIG. 5 shows a range of a gap length g which can achieve a high track density having the above track pitch without degrading signal quality.

As described above, according to this embodiment, an incomplete erasure phenomenon caused by a track positioning error of the recording head can be avoided using a side-fringe magnetic field leaking from the gap of the recording head to the outside of the track. A signal on an adjacent track is not unnecessarily erased by the side-fringe magnetic field. In addition, since a reproduction width is large, a large reproduction output can be obtained, thereby obtaining a high SNR.

In this embodiment, when the reproduction track width Tr of the reproducing head is set to be smaller than Tp+2a, a data signal on an adjacent track is not erroneously read, and the signal quality of servo and data signals can be improved.

The following method of forming erase regions between recording tracks may be used. That is, an erasing head, e.g., a head called a tunnel erase head, may be arranged near the recording head in place of a side-fringe magnetic field, and erase regions may be formed on both the sides of a recording track.

Second Embodiment

FIG. 6 is a partially sectional perspective view showing the arrangement of a magnetic recording/reproducing system according to the second embodiment. This magnetic recording/reproducing system is constituted by a composite perpendicular magnetic recording head 16 and a perpendicular magnetic recording medium 17.

The composite perpendicular magnetic recording head 16 is a head having a perpendicular magnetic recording magnetoresistance effect element (MR element) for reproducing a magnetic signal recorded in a perpendicular magnetic recording medium, and the composite perpendicular magnetic recording head 16 is in contact with the perpendicular magnetic recording medium 17 through an arm 3 so as to oppose the perpendicular magnetic recording medium 17. The composite perpendicular magnetic recording head 16 is positioned by an actuator (not shown) on a desired track 4 of a plurality of tracks concentrically formed in the perpendicular magnetic recording medium 17.

The perpendicular magnetic recording medium 17 is obtained as follows. That is, a soft magnetic backing layer 19 having a thickness of 0.1 µm and consisting of CoZrNb, a perpendicular anisotropic layer 20 consisting of CoPt, and a protective layer 21, having a thickness of 0.01 µm and consisting of $ZrO_2$, for assuring durability against the contact with the head 16 and an insulating property between the MR head and the recording medium are sequentially stacked on a nonmagnetic glass substrate 18.

Figure 7:
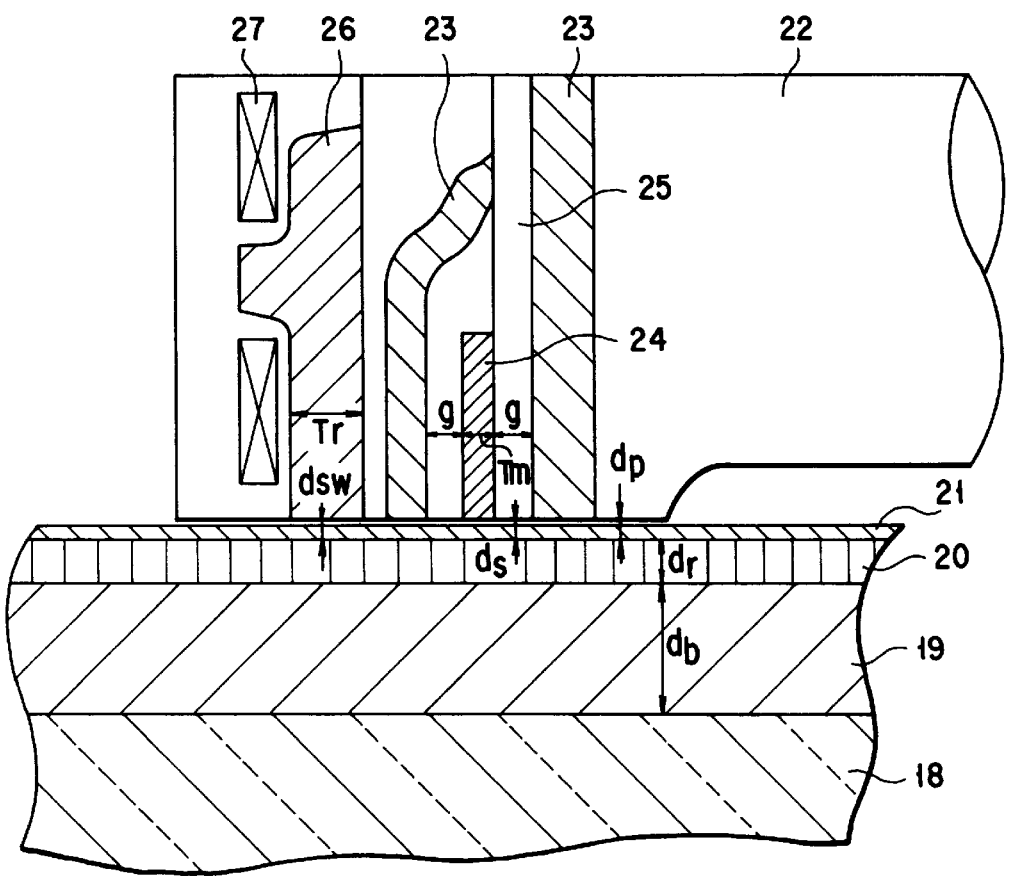
FIG. 7 is a sectional view showing the magnetic recording/reproducing system according to the second embodiment.

FIG. 7 is a sectional view showing the magnetic recording/reproducing system according to this embodiment along a direction in which the head and the medium are relatively moved. The composite perpendicular magnetic recording head 16 was formed such that a reproducing MR element 24 having a thickness of 0.04 µm and a track width of Tr=1.85 µm was formed on the distal end of a needle-like ceramic suspension 22 through a non-magnetic insulating material 25. A main recording magnetic pole film 26 consisting of FeSi was formed on the end of the resultant structure, and a coil 27 was applied to the recording main magnetic pole film 26.

Figure 8:
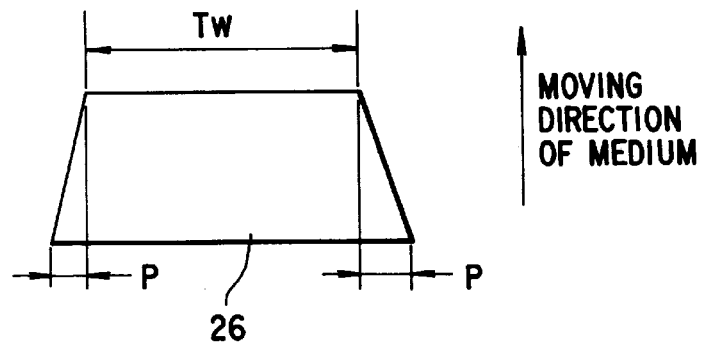
FIG. 8 is a schematic view showing a magnetic head in the second embodiment.

FIG. 8 is a view showing the structure of the main recording magnetic pole film 26 when viewed from a surface opposite to the medium. The main recording magnetic pole film 26 was tapered to have a narrow trailing side, and the width of the tapered portion was represented by p. A track pitch Tp was 1.8 µm, a track width Tw was 1.5 µm, and the width p of the taper was 0.1 µm. In the recording/reproducing experiment, a track positioning error 2δ was 0.08 µm.

In perpendicular magnetic recording using a perpendicular magnetic recording single-pole head and a perpendicular magnetic recording medium, since a side-fringe magnetic field leaking outside a track is very abruptly attenuated, an erase region is rarely present. For this reason, when the side-face end portion, having a main pole, of the recording main magnetic pole film 26 in a direction of track width is tapered to have a trailing side having a width smaller than that of the side opposed the trailing side by 2p=0.2 µm, as shown in FIG. 8, erase regions having a width corresponding to the width p=0.1 of the tapered portion can be formed on both the side edges of the recording track. Due to the high recording resolution of a perpendicular magnetic recording scheme, magnetization transition having the same inclination as the taper angle is formed in each of the erase regions. However, since a large azimuth angle between the reproducing head and the erase region is very large, no effective reproduction signal cannot be supplied to the erase region, and the region substantially operates as an erase region. In addition, when a condition wherein the erase region does not unnecessarily erase a recording signal on an adjacent track is considered, assuming that the width of the taper portion is represented by p, the width can be defined by inequality (9).

In this embodiment, as in the first embodiment, incomplete erasure of a recording track is eliminated, and an SNR was not decreased. In addition, signal quality was not degraded by an erase operation of an adjacent track.

Third Embodiment

Figure 9:
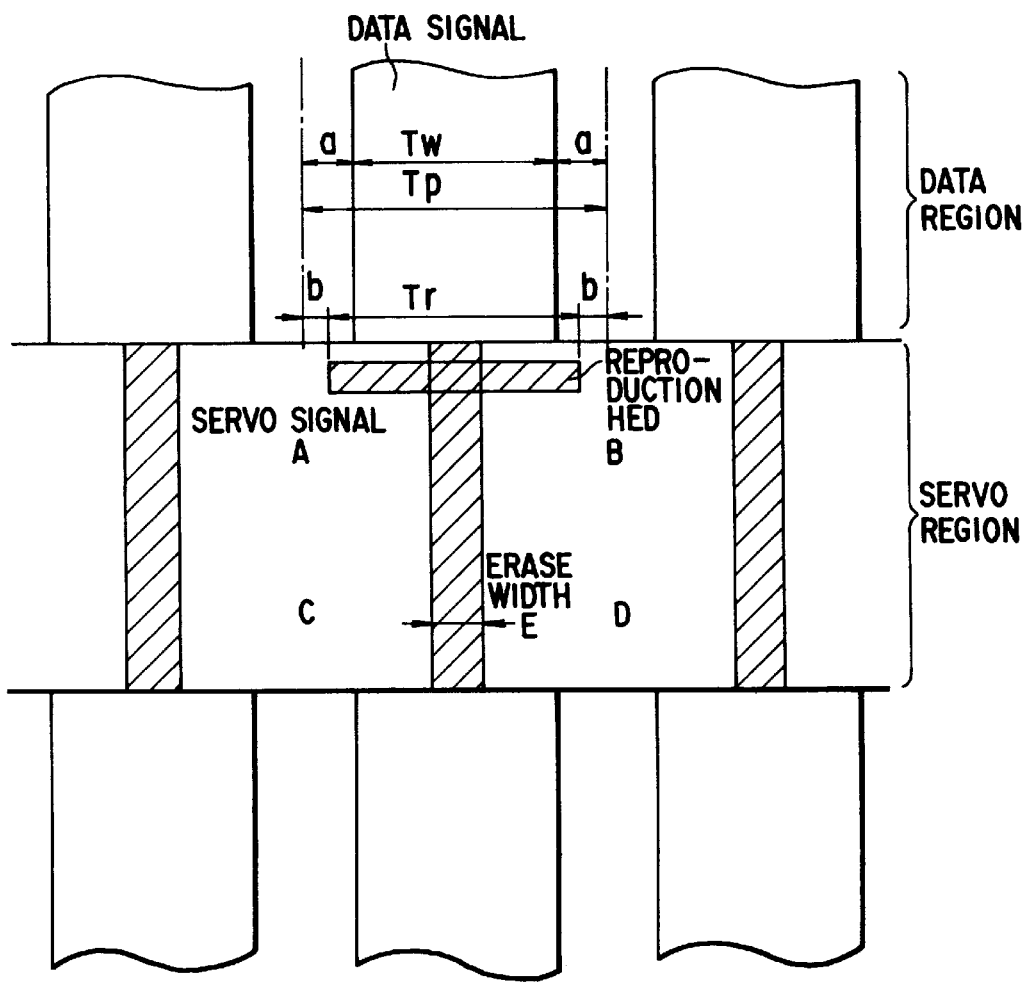
FIG. 9 is a view showing an arrangement of recording tracks in the third embodiment.

FIG. 9 shows relationships between a recording track width Tw of a recording head, a reproduction width Tr of a reproducing head, and a track pitch Tp on a recording medium in a magnetic recording/reproducing system according to the third embodiment. When the relationships are defined as Tp−Tw=2a and Tp−Tr=2b, two conditions of a>b and Tr<Tp+2a are satisfied. In other words, the reproduction width Tr is larger than the recording track width Tw, and the reproduction width Tr, as indicated by broken lines in FIG. 9, can be increased to a maximum of about Tp+2a.

More specifically, the recording track width Tw=1.5 µm, the reproduction width Tr=1.8 µm, and the track pitch Tp=2.0 µm, i.e., a=0.25 µm and b=0.1 µm were satisfied. In this case, a>b was satisfied, and Tr<Tp+2a was satisfied.

That is, in the magnetic recording/reproducing system in which data signals and servo signals for tracking are recorded in the same track, when different servo signals are respectively recorded on both the sides of the center line of a data track, which center line is used as a boundary, an erase region having the width E is formed on the boundary portion by the recording head, a servo signal is lost in this portion. When the reproducing head having the reproduction width Tr reads a servo signal, since reproduction is performed across the erase region of a servo signal, a substantial servo signal width is Tr−E. In this case, when the width Tr of the reproducing head is set to be larger than Tw+E, a servo signal lost by the erase region can be compensated, a servo signal having excellent signal quality can be reproduced, and tracking precision can be improved. In consideration of the erase width E>0, Tr>Tw, i.e., a>b, is satisfied.

Since the widths and the pitch are set as described above, even an increase in the erase width E to, e.g., about 0.3 µm, makes it possible to reproduce a servo signal without degrading the quality of the servo signal. In addition, an error caused by reproducing a signal from an adjacent track can be prevented.

Fourth Embodiment

Figure 10A:
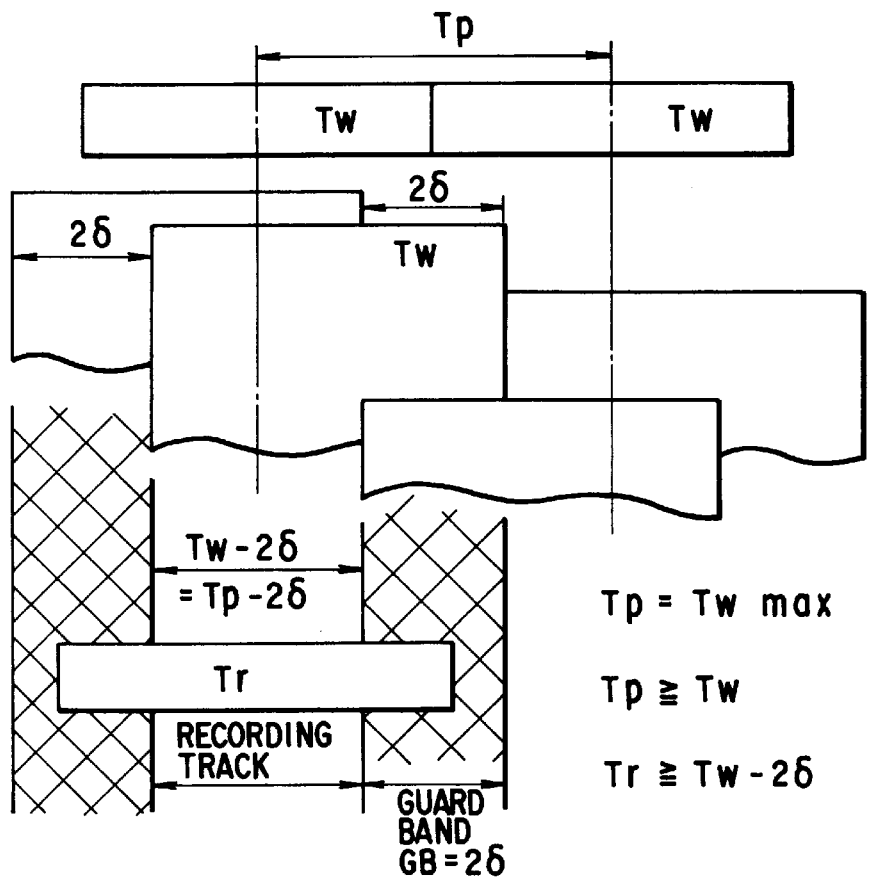
FIG. 10A is a view showing an arrangement of recording tracks in the fourth embodiment.
Figure 10B:
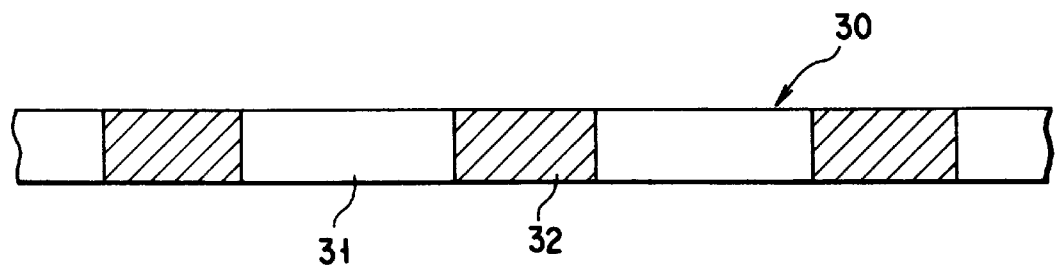
FIG. 10B is a schematic sectional view showing a magnetic recording medium in the fourth embodiment.

FIG. 10A is a view showing a relationship between a recording track width Tw of a recording head, a reproduction width Tr of a reproducing head, and a track pitch Tp on a magnetic recording medium in a magnetic recording/reproducing system according to the fourth embodiment. FIG. 10B is a sectional view showing a magnetic layer 30 of the recording medium along a track direction. In this embodiment, the saturation magnetization of a non-signal region (to be referred to as a guard band region) 32 between recording tracks is lower than the saturation magnetization of a recording track region 31 of the magnetic layer 30, so a signal cannot substantially easily be recorded in the guard band region 32. When the positioning error of the recording and reproducing heads is set to be 2δ, the width GB of the guard band region 3 in a direction of recording track width satisfies a condition of GB=2δ. If the track pitch is represented by Tp, and Tp−Tw=2a, a condition of Tr>Tp−2δ−2a is satisfied. As in the above embodiments, a relationship between the recording track width Tw and the reproduction width Tr satisfies a condition of Tr>Tw.

In this embodiment, as shown in FIGS. 10A and 10B, Tp=Twmax, Tp≧Tw, and Tr≧Tw−2δ are satisfied, and an erase region need not be formed by a side-fringe region. As described above, even if the non-signal region is formed as the guard band region 32 using the characteristics of the magnetic layer of the magnetic recording medium, the same effect as described in the above embodiments can be obtained by a synagetic effect of the guard band region and Tr>Tw.

Fifth Embodiment

Figure 11A:
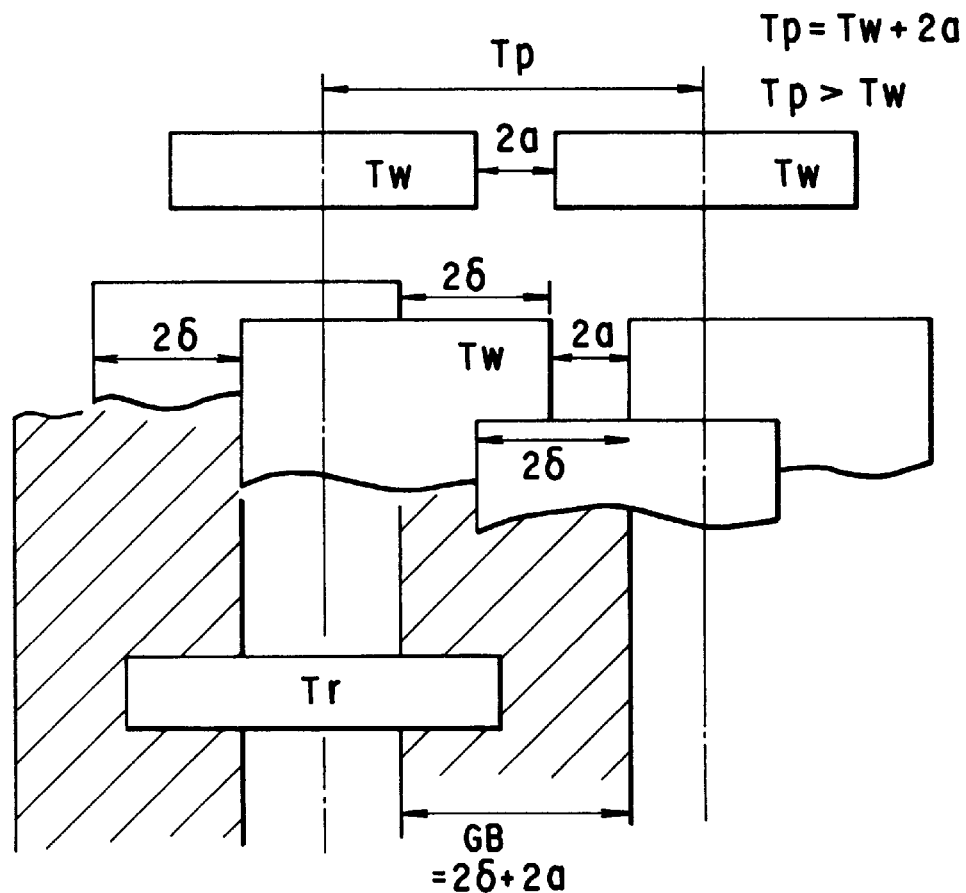
FIG. 11A is a view showing an arrangement of recording tracks in the fifth embodiment.
Figure 11B:
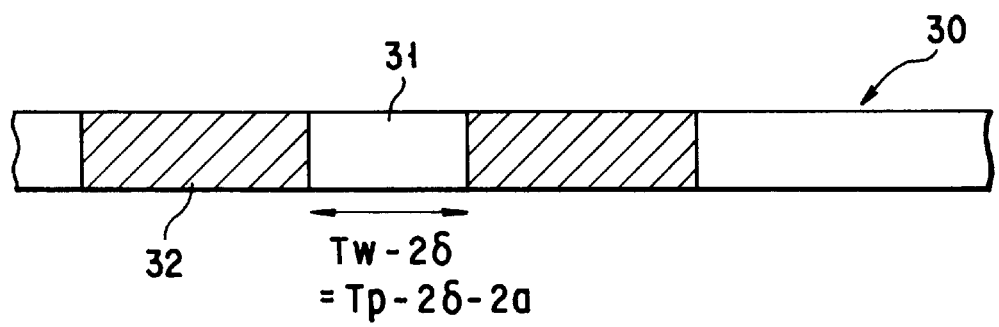
FIG. 11B is a schematic sectional view showing a magnetic recording medium in the fifth embodiment.

FIG. 11A is a view showing a relationship between a recording track width Tw of a recording head, a reproduction width Tr of a reproducing head, and a track pitch Tp on a magnetic recording medium in a magnetic recording/reproducing system according to the fourth embodiment. FIG. 11B is a sectional view showing a magnetic layer 30 of the recording medium along a track direction, and the fifth embodiment is basically the same as the fourth embodiment. In this embodiment, as in FIGS. 11A and 11B, when Tp=Tw+2a and Tp>Tw are satisfied, Tr>Tw is set. Note that the fifth embodiment corresponds to a case for 2a=0.

Sixth Embodiment

Figure 12A:
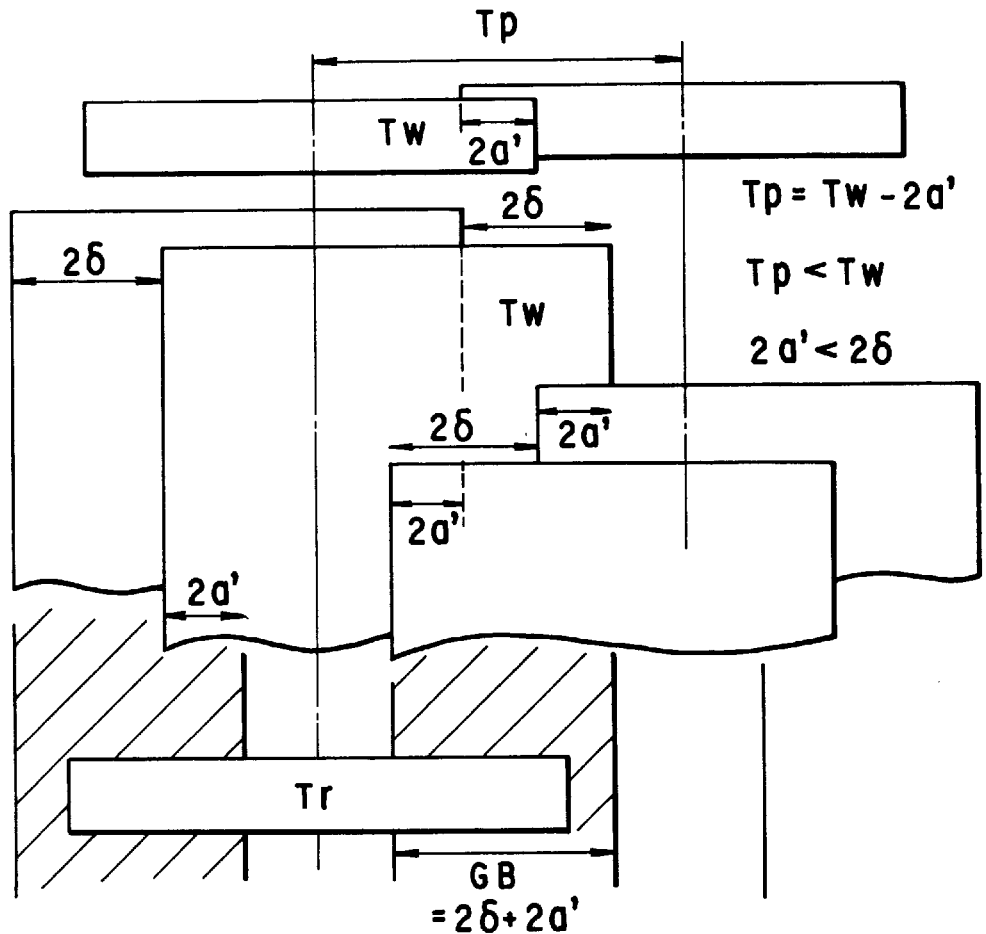
FIG. 12A is a view showing an arrangement of recording tracks in the sixth embodiment.
Figure 12B:
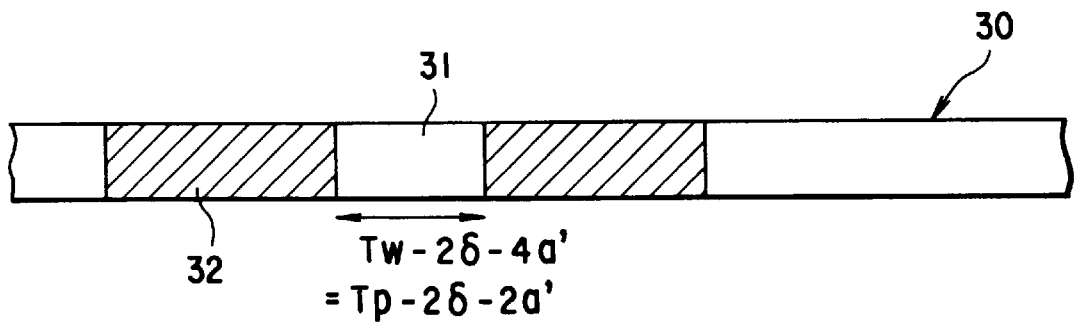
FIG. 12B is a schematic sectional view showing a magnetic recording medium in the sixth embodiment.

FIG. 12A is a view showing a relationship between a recording track width Tw of a recording head, a reproduction width Tr of a reproducing head, and a track pitch Tp on a magnetic recording medium in a magnetic recording/reproducing system according to the sixth embodiment. FIG. 12B is a sectional view showing a magnetic layer 30 of the recording medium along a track direction, and the sixth embodiment is basically the same as the fourth embodiment. In the sixth embodiment, as in FIGS. 12A and 12B, when Tp=Tw−2a', 2a'<2δ, and Tp<Tw are satisfied, Tr>Tw is set. Reference number 2a' denotes an overlapping region between adjacent recording tracks.

Although each of the above-described various preferred embodiments are related to a magnetic head, an embodiment of a magnetic recording medium having a guard band region will be described below. A magnetic recording medium (to be described later) is a medium having at least a recording magnetic layer on a disk-like substrate. In this medium, a recording track region and a guard band region have different compositions and different fine structures. The coercive force of the guard band region is set to be smaller than that of the recording track region, or the magnetic permeability of a guard band region of a soft magnetic backing layer is set to be smaller than that of the recording track region when a vertical two-layered substrate is used.

The coercive force of the guard band region is decreased as described above so as to extend the magnetic inversion region of the guard band region, so a signal cannot be substantially recorded in the guard band region. Since noise generated from the above guard band region is localized in a low-frequency region, the noise is electrically cut by a filter to increase an SNR at a recording wavelength. In addition, in the two-layered medium, when the magnetic permeability of a soft magnetic backing layer in the guard band region is decreased, the magnitude of a signal from the guard band region can be reduced, thereby increasing an SNR.

In order to obtain the above magnetic recording medium, after a magnetic field is formed, a laser or electron beam is radiated on a track region to increase the temperature of the track region, and oxygen or Cr is diffused in the track region to increase the coercive force of the track region, so that the coercive force of the track region is different from the coercive force of the guard band region. The vertical two-layered medium described later is formed as follows. That is, a soft magnetic backing layer having a perpendicular magnetic anisotropy is formed, a laser or electron beam is radiated on the track region to increase the temperature of the track region so as to decrease the perpendicular magnetic anisotropy of the track region, thereby increasing the magnetic permeability of the track region.

Seventh Embodiment

Figure 13:
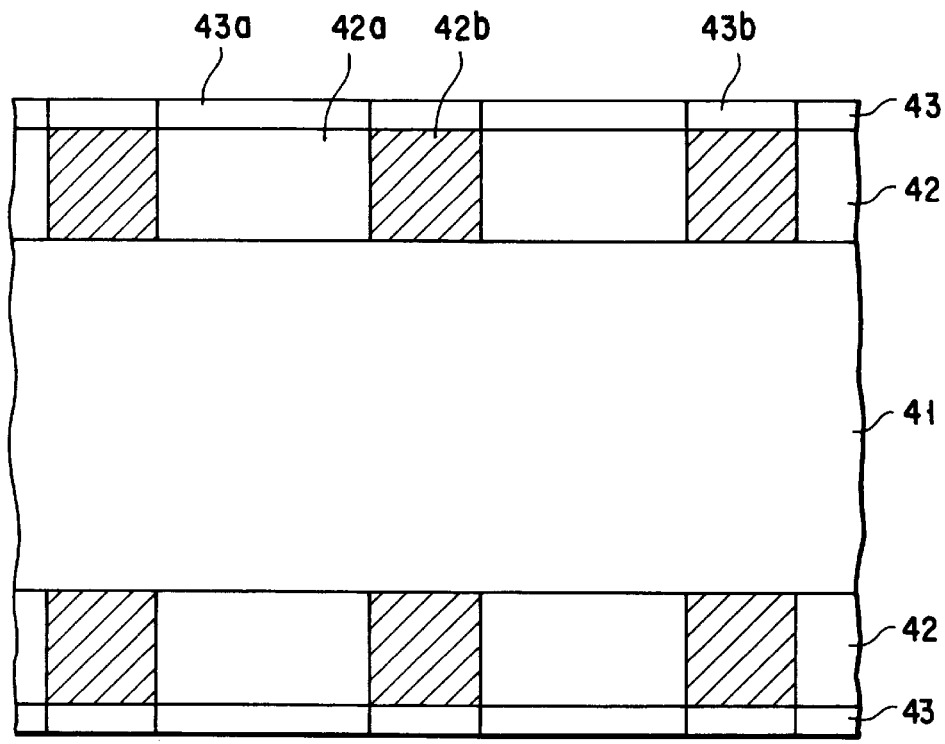
FIG. 13 is a schematic sectional view showing a magnetic recording medium according to the seventh embodiment.

FIG. 13 is a sectional view showing a magnetic recording medium according to the seventh embodiment. As shown in FIG. 13, a magnetic layer 42 and a protective layer 43 are sequentially stacked on each of both the surfaces of a disk-like substrate 41, and track regions 42a and 43a and guard band regions 42b and 43b are formed in each of the magnetic layers 42 and each of the protective layers 43, respectively. In this case, the coercive force of the guard band region 42b of the magnetic layer 42 is smaller than that of the track region 42a.

The steps in manufacturing the magnetic recording medium will be described below. A Co-24at.% Pt film was formed on a 2.5" glass substrate by DC magnetron sputtering in an Ar atmosphere containing oxygen. Thereafter, an $SiO_2$ protective film having a thickness of 10 nm was formed on the Co-24at.% Pt film, thereby obtaining a magnetic recording medium. In this medium, an Ar laser beam which was focused at a pitch of 4.5 $\mu$m and a power density of $10^3$ to $10^8$ W/cm$^2$ on the surface of a magnetic layer to have a diameter of 3 $\mu$m scanned a track region to locally heat the magnetic layer.

Figure 14:
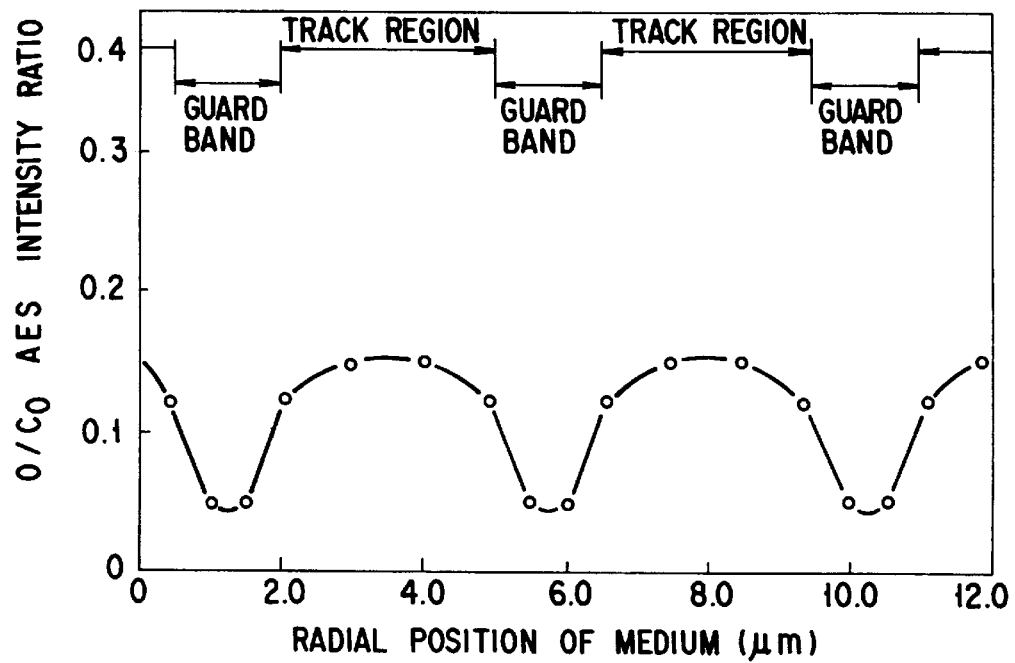
FIG. 14 is a graph showing an oxygen concentration distribution of the magnetic recording medium according to the seventh embodiment.

As a result, as shown in FIG. 14, when the power density was set to be $10^5$ to $10^6$ W/cm$^2$, an AES strength ratio of the oxygen concentration to the Co concentration in the track region was increased to 0.1 or more. Therefore, this value was different from the AES strength ratio of 0.08 or less in the guard band region, and as shown in FIG. 15, a magnetic recording medium in which the longitudinal coercive force of the track region was 1,800 (Oe) or more in Kerr effect measurement could be obtained. The longitudinal coercive force of the track region of the magnetic recording medium was larger than that of the guard band region of the magnetic recording medium.

When the R/W characteristic of the magnetic recording medium and the R/W characteristic of a conventional magnetic recording medium on which a laser beam was not radiated were measured with a head having a track width of 4 $\mu$m, an amount of noise from the guard band region of the medium of this embodiment was smaller than that from the guard band region of the conventional medium, and the SNR of the medium of this embodiment was higher than that of the conventional medium by about 2 dB. In addition, since noise of the magnetic recording medium of this embodiment was frequently generated on a low-frequency side, when the low-frequency component of a signal of the recording medium was cut, the SNR could be more increased.

In this method, although irradiation of a laser beam is performed after the protective film is formed, this irradiation may be performed before the protective film is formed. In this embodiment, although a laser beam is focused to have a spot size of 3 $\mu$m is used, when a laser beam having a smaller spot size is used, the widths of the track and guard band regions can be decreased. In addition, when an electron beam is used, the widths of the track and guard band regions can be decreased, and a medium having a high track density can be manufactured. As the track density of a medium is increased, the medium is more improved than a conventional recording medium. A high-frequency current is locally supplied to both the surfaces of the magnetic layer to locally heat the magnetic layer using the resistances in the magnetic layer, thereby manufacturing a recording medium. In addition, in this embodiment, the track region is heated. However, a stronger laser or electron beam can be radiated on the guard band region to set the guard band region in an amorphous state, thereby decreasing the coercive force of the guard band region. In this case, when this operation is performed in an oxygen atmosphere, a large amount of oxygen is doped in the guard band region to decrease a magnetization amount of the guard band region. In addition, when an underlying layer consisting of Cr, Ti, Nb, B, or the like which can hardly be present in the form of a solid solution in the magnetic layer is formed between the substrate and the magnetic layer, these atoms are diffused in the magnetic layer from the direction of the substrate, thereby obtaining a more effective recording medium.

In the magnetic recording medium of this embodiment, the surface of the track region is coarse. For this reason, adsorption of the recording medium can hardly occur as compared with a conventional recording medium.

Eighth Embodiment

FIG. 16 is a sectional view showing a magnetic recording medium for perpendicular magnetic recording according to the eighth embodiment. A soft magnetic backing layer 52, a perpendicular magnetic anisotropic layer (to be referred to as a perpendicular magnetic film) 53, and a protective layer 54 are sequentially formed on each of both the surfaces of a disk-like substrate 51, and track regions 52a, 53a, and 54a and guard band regions 52b, 53b, and 54b are formed in the soft magnetic backing layer 52, the perpendicular magnetic anisotropic layer 53, and the protective layer 54, respectively. In this case, the magnetic permeability of the guard band region 52b of the soft magnetic backing layer 52 is smaller than that of the track region 52a.

The steps in manufacturing the magnetic recording medium will be described below. A soft magnetic backing layer consisting of Co-5at.% Zr-8at.% Nb, having a relative magnetic permeability of 200 or less in the circumferential direction and a magnetic anisotropy of 250 Oe in the radical direction was formed on a 2.5" glass substrate by DC magnetron sputtering to have a thickness of 0.5 $\mu$m while a magnetic field was applied in the radial direction. A CoPtO perpendicular magnetic film having a thickness of 50 nm was formed by oxygen-doped sputtering. Thereafter, an SiO$_2$ protective film having a thickness of 10 nm was formed on the resultant structure, thereby obtaining a magnetic recording medium.

An Ar laser beam having a spot size of 4 μm scanned a track region at a pitch of 4.5 μm and a power density of 10$^3$ to 10$^8$ W/cm$^2$ on the magnetic recording medium to locally heat the track region.

As a result, when the power density was set to be 10$^4$ to 10$^5$ W/cm$^2$, an AES strength ratio of the oxygen concentration to the Co concentration in a track region of the perpendicular magnetic film was increased to 0.1 or more. Therefore, this value was different from the AES strength ratio of 0.08 or less in the guard band region, and the perpendicular coercive force of the track region was larger than the perpendicular coercive force of the guard band region. In addition, a magnetic recording medium in which the magnetic anisotropy of the soft magnetic backing layer of the track region was 20 Oe or less and a relative magnetic permeability in the track direction was increased to 500 or more, as shown in FIG. 17, was obtained.

When the R/W characteristic of the magnetic recording medium and the R/W characteristic of a conventional magnetic recording medium on which a laser beam was not radiated were measured, an amount of noise from the guard band region of the medium of this embodiment was smaller than that from the guard band region of the conventional medium, and the SNR of the medium of this embodiment was higher than that of the conventional medium by about 2 dB. In addition, since noise of the magnetic recording medium of this embodiment was frequently generated on a low-frequency side, when the low-frequency component of a signal of the recording medium was cut, the SNR could be more increased.

In this embodiment, although Co-5at.% Zr-8at.% Nb is used as the material of the soft magnetic backing layer, when a material having a large magnetostrictive constant is used, deformation caused by heat can be reduced to increase a difference between the characteristics of the track region and the characteristics of the guard band region.

In the medium of this embodiment, the surface of the track region is coarse. For this reason, adsorption of the recording medium can hardly occur as compared with a conventional recording medium.

Ninth Embodiment

The steps in manufacturing a magnetic recording medium according to the ninth embodiment will be described below. A Co-5at.% Zr-8at.% Nb soft magnetic backing layer having a thickness of 0.5 μm was formed on a 2.5" glass substrate by DC magnetron sputtering, and a CoPtO perpendicular magnetic film having a thickness of 50 nm was formed on the resultant structure by oxygen-doped sputtering. Thereafter, an SiO$_2$ protective film having a thickness of 10 nm was formed on the resultant structure, thereby obtaining a magnetic recording medium.

A Ti-ion beam having a spot size of 3 μm was radiated on a track region at a pitch of 4.5 μm on the magnetic recording medium. As a result, as shown in FIG. 18, segregation of Ti was observed in the track region, and a medium in which the perpendicular coercive force of the track region was larger than that of a guard band region could be obtained.

When the R/W characteristic of the magnetic recording medium of this embodiment and the R/W characteristic of a conventional magnetic recording medium on which an ion beam was not radiated were measured, an amount of noise from the guard band region of the medium of this embodiment was smaller than that from the guard band region of the conventional medium, and the SNR of the medium of this embodiment was higher than that of the conventional medium by about 2 dB.

As another embodiment, a beam of another ion as of Cr, W, B, C, or P which can hardly be present in the form of a solid solution in Co may be used in place of the Ti-ion beam. In addition, adsorption of the recording medium of this embodiment can hardly occur as compared with a conventional recording medium.

Tenth Embodiment

Figure 19:
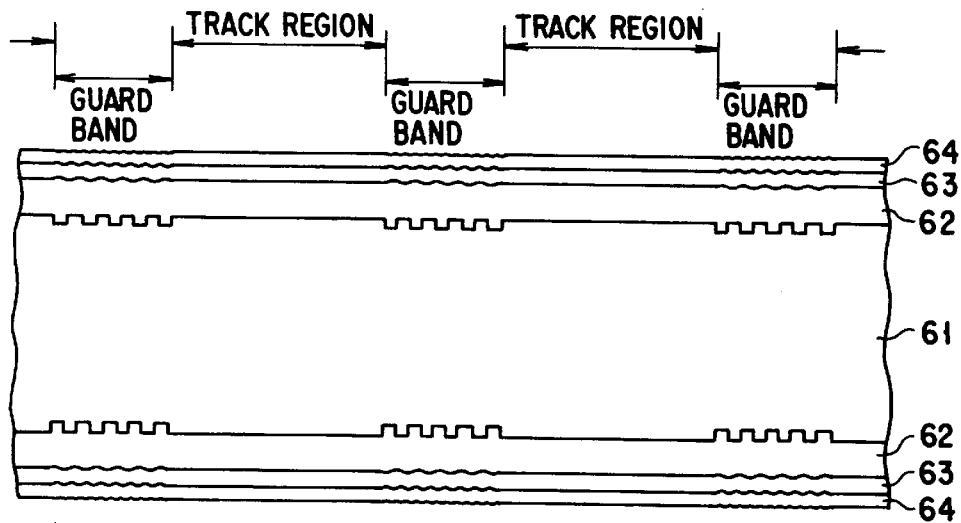
FIG. 19 is a schematic sectional view showing a magnetic recording medium according to the tenth embodiment.

FIG. 19 is a sectional view showing a magnetic recording medium for perpendicular magnetic recording according to the tenth embodiment. A soft magnetic backing layer 62, a perpendicular magnetic film 63, and a protective layer 64 are sequentially formed on each of both the surfaces of a disk-like substrate 61, and a three-dimensional pattern is formed on each of the surfaces of the substrate 61 in each guard band region, as shown in FIG. 18. The relative magnetic permeability of each of the guard band regions of the soft magnetic backing layers 62 is smaller than that of each of the recording track regions of the soft magnetic backing layers 62.

The steps in manufacturing this magnetic recording medium will be described below. Regions corresponding to the guard band regions on each of the surfaces of a 2.5" Si substrate were chemically processed, so that a three-dimensional pattern was formed in each of the regions on the order of 1 to 10 atoms. An Fe—N soft magnetic backing layer having a thickness of 0.2 μm was formed on the substrate, so that a layer in which the relative magnetic permeability of a guard band region was lower than that of a track region could be obtained. A CoPtO perpendicular magnetic film having a thickness of 50 nm was formed on the soft magnetic backing layer by oxygen-doped sputtering, so that a layer in which the perpendicular magnetic anisotropy of a guard band region was smaller than that of a track region could be obtained. Thereafter, an SiO$_2$ protective film having a thickness of 10 nm was formed on the resultant structure, thereby obtaining a magnetic recording medium.

When the R/W characteristic of the magnetic recording medium and the R/W characteristic of a conventional magnetic recording medium whose surface was uniformly coarse were measured, the SNR of the medium of this embodiment was higher than that of the conventional recording medium by about 3 dB. In addition, adsorption of the recording medium of this embodiment can hardly occur as compared with a conventional recording medium.

In this embodiment, although the present invention is applied to a vertical two-layered medium, this method of the present invention can be applied to a longitudinal recording substrate having no soft magnetic backing layer. More specifically, in a medium where a layer such as a Cr layer having a Bcc structure is formed, since the crystal orientation of a guard band region is different from that of a track region, the direction of the magnetic anisotropy of a magnetic layer in the guard band region is effectively different from the direction of the magnetic anisotropy of the magnetic layer in the track region.

Eleventh Embodiment

Figure 20:
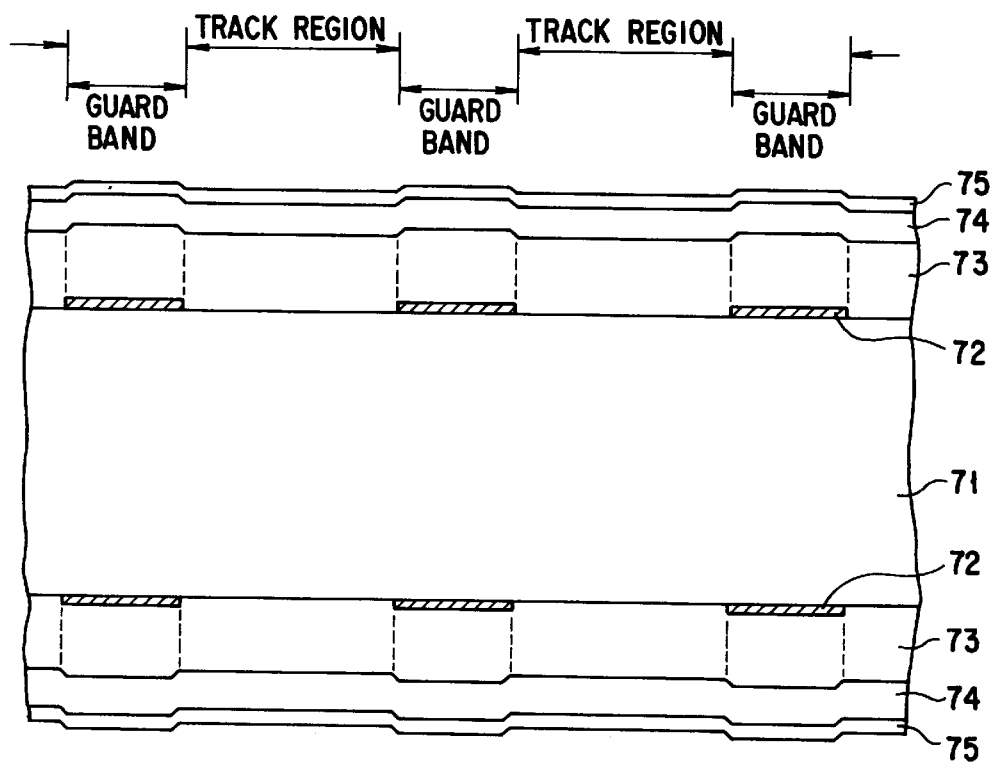
FIG. 20 is a schematic sectional view showing a magnetic recording medium according to the eleventh embodiment.

FIG. 20 is a sectional view showing a magnetic recording medium for perpendicular magnetic recording according to the eleventh embodiment. A soft magnetic backing layer 73, a perpendicular magnetic film 74, and a protective film 75 are sequentially stacked on each of both the surfaces of a disk-like substrate 71, and an antiferromagnetic film 72 is partially formed in each guard band region of the substrate 71. For this reason, the relative magnetic permeability of each guard band region of the soft magnetic backing layer 73 is smaller than that of each recording track region of the soft magnetic backing layer 73.

The steps in manufacturing this magnetic recording medium will be described below. An FeMn film serving as an antiferromagnetic film and having a thickness of 5 nm was formed, using masking, in each of regions corresponding to the guard band regions of the surfaces of a 2.5" glass substrate. While a vacuum state was kept, and while a magnetic field having a coercive force of 20 Oe or more was applied in a radial direction by a magnet, a CoZrNb layer having a thickness of 0.5 μm was formed, and a CoPtO perpendicular magnetic film having a thickness of 50 nm was formed on the CoZrNb layer by oxygen-doped sputtering. Thereafter, an $SiO_2$ protective film having a thickness of 10 nm was formed, thereby obtaining a magnetic recording medium.

When the R/W characteristic of the magnetic recording medium and the R/W characteristic of a conventional medium in which an FeMn film was formed on the entire surface of a substrate were measured, the SNR of the medium of this embodiment was higher than that of the conventional medium by about 3 dB.

Twelfth Embodiment

Figure 21:
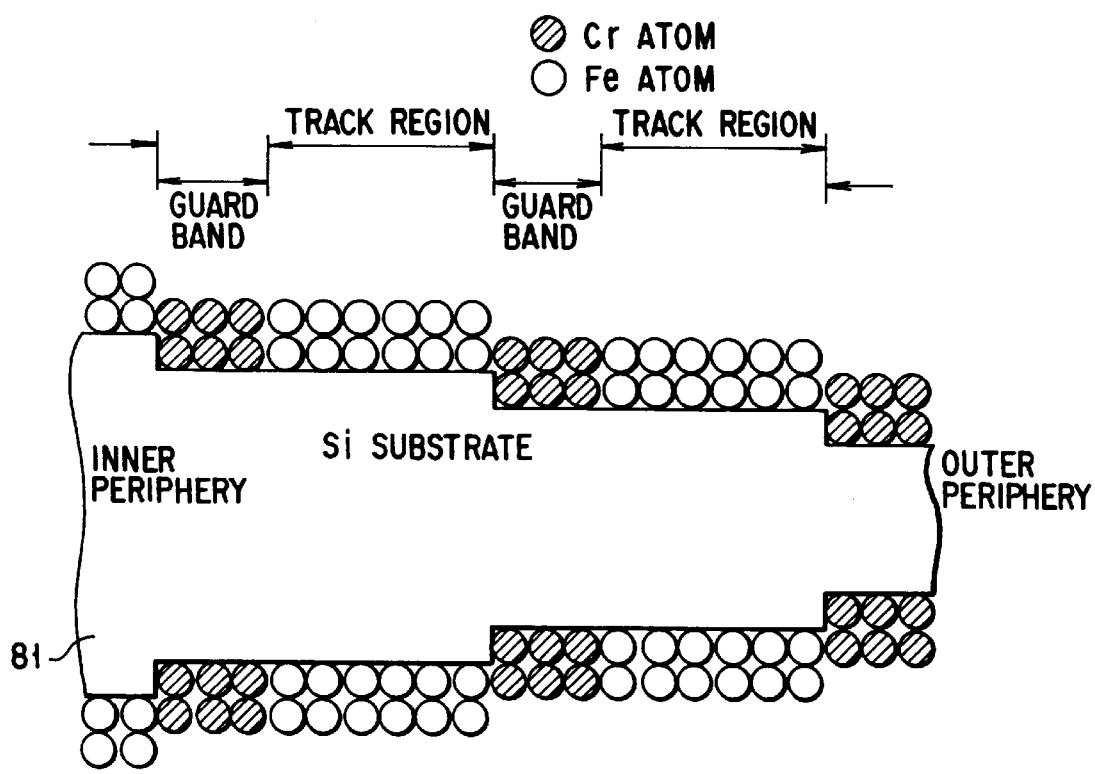
FIG. 21 is a schematic sectional view showing a magnetic recording medium according to the twelfth embodiment.

FIG. 21 is a sectional view showing a magnetic recording medium for perpendicular magnetic recording according to the twelfth embodiment. In FIG. 21, steps are regularly periodically formed on both the surfaces of a disk-like substrate 81 in a radial direction, and a soft magnetic backing layer and a perpendicular magnetic film are sequentially formed on each of the surfaces of the disk-like substrate 81.

The steps in manufacturing this magnetic recording medium will be described below. Each of the surfaces of a 2.5" Si substrate was chemically processed such that steps were formed on the order to 1 to 10 atoms with a period having the sum of the widths of a guard band region and a track region. Cr atoms were sequentially embedded from the wall surface of each of the steps to have a width equal to that of the guard band region, and Fe atoms were arranged up to the edge of each of the steps such that each track region was constituted by Fe atoms. In addition, Cr atoms and Fe atoms were alternately arranged. At this time, as the height of each of the steps of the Si substrate was close to the diameter of an Fe atom, the guard band regions and the track regions were formed without mixing Cr atoms with Fe atoms. In this manner, a film having a thickness of 0.5 μm, and a CoPtO perpendicular magnetic film having a thickness of 50 nm was formed on this film by oxygen-doped sputtering. Thereafter, an $SiO_2$ protective film having a thickness of 10 nm was formed, thereby obtaining a magnetic recording medium.

When the R/W characteristic of the magnetic recording medium and the R/W characteristic of a conventional magnetic recording medium were measured, the SNR of the medium of this embodiment was higher than that of the conventional medium by about 3 dB.

In this embodiment, although the above structure is applied to the soft magnetic backing layer of a vertical two-layered medium, the structure can also be directly applied to a perpendicular magnetic film. In this embodiment, although Fe and Cr are used as two different elements, another combination of elements each having an atomic radius which is smaller than 1.2 times the atomic radius of each of Fe and Cr may be used.

As has been described above, according to a magnetic recording medium as described in the eighth to twelfth embodiments, the following advantages can be obtained. That is, a high SNR can be obtained even when a track density is high, and high productivity can be obtained, and an adsorption phenomenon rarely occurs.

Although an MR head is used as a reproducing head in the above embodiments, when another head such as an active head for performing reproduction using a high-frequency magnetic resonance phenomenon of a magnetic material, an inductive ring head, or an inductive perpendicular magnetic recording single-pole head is used, the present invention can be applied.

As described above, according to the present invention, when a high track density is to be obtained by increasing a track pitch, an incomplete erasure phenomenon during recording or degradation of signal quality in signal erasure caused by interference from an adjacent track can be avoided. For this reason, a magnetic recording/reproducing system having a high recording density and high reliability can be provided.

In addition, a magnetic recording/reproducing system having the following advantages can be provided. That is, even when a track pitch is decreased, a servo signal having excellent quality can be reproduced, tracking precision can be improved, errors caused by tracking can be reduced to improve reliability, a reproduction output is increased, and an SNR is high.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic recording/reproducing system comprising:
    a magnetic head member including a ring recording head having a magnetic gap length g and a recording track width Tw and a reproducing head having a reproducing track width Tr; and
    a rotatable magnetic recording disk having recording tracks recorded and reproduced by said magnetic head member,
    wherein said magnetic gap length g is expressed by the following inequalities:

$$g<(1500/Hc-Hc/4000\pi+0.3)/(Hc/400\pi-\frac{1}{2})$$

and $$g>(1500/Hc-Hc/4000\pi+0.3-Tp+Tw)/(Hc/400\pi-\frac{1}{2}),$$

where, Tp is a pitch of said recording tracks of said rotatable magnetic recording disk, and Hc is a coercive force of said magnetic recording disk,
    wherein g is selected in the stated range so that the ring recording head generates a side fringe magnetic field, which extends beyond said recording track width Tw, to erase a side-fringe erase region extending outside a selected recording track in said recording disk without erasing data on adjacent tracks of said selected recording track.

2. A system according to claim 1, wherein a>b and Tr<Tp+2a, where, 2a is equal to Tp−Tw, and 2b is equal to Tp−Tr.

3. A system according to claim 1, wherein Tr is larger than Tw and the reproducing track width Tr overlaps the side-fringe erase region.

4. The system of claim 3, wherein the side-fringe erase region has a maximum width of 0.21 μm on each side of the reproducing track.

5. The system of claim 3, wherein the reproducing track width Tr is essentially 0.3 μm greater than Tw.

6. The system of claim 3, wherein the reproducing track width Tr is essentially 0.4 μm greater than Tw.

7. The system of claim 6, wherein the track pitch Tp is essentially 2.5 μm.

8. The system of claim 3, wherein the recording track width Tw is 1.5 μm and the reproducing track width Tr is 1.85 μm.

9. The system of claim 3, wherein the reproducing track width Tr is 2.4 μm and the recording track width is Tw 2.0 μm.

10. A magnetic recording/reproducing system having recording tracks and a reproducing head with a reproducing track width Tr and a recording head with a recording track width Tw for recording/reproducing a signal with reference to a magnetic recording medium by means of a magnetic head which comprises:

a ring recording head having a magnetic gap length g and a reproducing head;

wherein said magnetic gap length g is expressed by the following inequalities:

$$g<(1500/Hc-Hc/4000\pi+0.3)/(Hc/400\pi-\tfrac{1}{2})$$

and $$g>(1500/Hc-Hc/4000\pi+0.3-Tp+Tw)/(Hc/400\pi-\tfrac{1}{2}),$$

where, Tp is a pitch of said recording tracks of said magnetic recording medium, and Hc is a coercive force of said magnetic recording medium, wherein g is selected in the stated range so that the ring recording head generates a side fringe magnetic field, which extends beyond said recording track width Tw, to erase a side-fringe erase region extending outside a selected recording track in said recording medium without erasing data on adjacent tracks of said selected recording track.

11. The system of claim 10, wherein Tr is larger than Tw and the reproducing track width Tr overlaps the side-fringe erase region.

12. The system of claim 11, wherein the side-fringe erase region has a maximum width of 0.21 μm on each side of the reproducing track.

13. The system of claim 11, wherein the reproducing track width Tr is essentially 0.3 μm greater than Tw.

14. The system of claim 11, wherein the reproducing track width Tr is essentially 0.4 μm greater than Tw.

15. The system of claim 14, wherein the track pitch Tp is essentially 2.5 μm.

16. The system of claim 11, wherein the recording track width Tw is 1.5 μm and the reproducing track width Tr is 1.85 μm.

17. The system of claim 11, wherein the reproducing track width Tr is 2.4 μm and the recording track width is Tw 2.0 μm.

18. A magnetic recording/reproducing method comprising the steps of:

recording a signal by a ring recording head having a magnetic gap length g on recording tracks of a recording disk, having a recording track width Tw, wherein said recording tracks have a track pitch Tp and said recording disk has a coercive force Hc; and reproducing the signal from the recording disk, wherein the track pitch Tp and the recording track width having a relationship of the following inequalities:

$$g<(1500/Hc-Hc/4000\pi+0.3)/(Hc/400\pi-\tfrac{1}{2})$$

and $$g>(1500/Hc-Hc/4000\pi+0.3-Tp+Tw)/(Hc/400\pi-\tfrac{1}{2}),$$

wherein g is selected in the stated range so that the ring recording head generates a side-fringe magnetic field, which extends beyond said recording track width Tw, to erase a side-fringe erase region extending outside a selected recording track in said recording medium without erasing data on adjacent tracks of said selected recording track.

* * * * *